US012417372B2

United States Patent
Lee et al.

(10) Patent No.: US 12,417,372 B2
(45) Date of Patent: Sep. 16, 2025

(54) SYSTEM FOR PREDICTING USER DROP-OUT RATE AND TRACKING USER KNOWLEDGE BASED ON ARTIFICIAL INTELLIGENCE LEARNING AND METHOD THEREFOR

(71) Applicant: RIIID INC., Seoul (KR)

(72) Inventors: Young Nam Lee, Seoul (KR); Dong Min Shin, Seoul (KR); Hyun Bin Loh, Seoul (KR); Jae Min Lee, Seoul (KR); Pil Jae Chae, Seoul (KR); Jung Hyun Cho, Seoul (KR); Seo Yon Park, Busan (KR); Jin Hwan Lee, Gyeonggi-do (KR); Jin Eon Baek, Seoul (KR); Byung Soo Kim, Seoul (KR); Young Duck Choi, Seoul (KR); Yeong Min Cha, Gyeonggi-do (KR); Chan Bae, Seoul (KR); Jae We Heo, Seoul (KR)

(73) Assignee: RIIID INC., Seoul (KR)

( * ) Notice: Subject to any disclaimer, the term of this patent is extended or adjusted under 35 U.S.C. 154(b) by 1051 days.

(21) Appl. No.: 17/435,698

(22) PCT Filed: Jun. 15, 2021

(86) PCT No.: PCT/KR2021/007459
§ 371 (c)(1),
(2) Date: Sep. 1, 2021

(87) PCT Pub. No.: WO2022/265127
PCT Pub. Date: Dec. 22, 2022

(65) Prior Publication Data
US 2022/0398434 A1    Dec. 15, 2022

(51) Int. Cl.
*G06N 3/045*    (2023.01)
*G06N 3/08*    (2023.01)

(52) U.S. Cl.
CPC ............... *G06N 3/045* (2023.01); *G06N 3/08* (2013.01)

(58) Field of Classification Search
USPC ......................................................... 706/25
See application file for complete search history.

(56) References Cited

PUBLICATIONS

Dewan et al.—2015—Predicting Dropout-Prone Students in E-Learning Education System—School of Computing and Information System, Faculty of Science and Technology Athabasca University Edmonton, pp. 1-6.*

(Continued)

*Primary Examiner* — Markus A. Vasquez
*Assistant Examiner* — Em N Trieu
(74) *Attorney, Agent, or Firm* — Sughrue Mion, PLLC

(57) ABSTRACT

The present disclosure relates to a system capable of increasing the accuracy of a prediction result when predicting a user drop-out rate or predicting a correct answer probability of a user in an online learning environment, and further relates to an operation method of the system. A system according to the present disclosure may include a plurality of encoder neural networks and a plurality of decoders, and may input question information to a $k^{th}$ encoder neural network and input response information to $k^{th}$ decoder neural network to learn the system, thereby predicting the user drop-out rate information and the users correct answer probability information with higher accuracy on the basis of the learned system.

14 Claims, 21 Drawing Sheets

(56) References Cited

PUBLICATIONS

Tan et al.—2015—Prediction of Student Dropout in E Learning Program Through the Use of Machine Learning Method—1 University of Electronic Science and Technology of China, Chengdu, P. R. China , pp. 1-7.*

Lykourentzou at al.—Feb. 25, 2009—Dropout prediction in e-learning courses through the combination of machine learning techniques—School of Electrical and Computer Engineering, National Technical University of Athens, Zographou Campus, 15773 Athens, Greece, pp. 950-965.*

* cited by examiner

|  | INPUT DATA | |
|---|---|---|
|  | QUESTION INFORMATION(E) | RESPONSE INFORMATION(R) |
| QUESTION IDENTIFICATION INFORMATION (id) | ✓ |  |
| QUESTION CATEGORY INFORMATION (c) | ✓ |  |
| START TIME INFORMATION (st) | ✓ | ✓ |
| INPUT SEQUENCE POSITION INFORMATION (p) | ✓ | ✓ |
| SESSION POSITION INFORMATION (sp) | ✓ | ✓ |
| RESPONSE ACCURACY INFORMATION (r) |  | ✓ |
| ELAPSED TIME INFORMATION (et) |  | ✓ |
| INPUT-ON-TIME INFORMATION (iot) |  | ✓ |
| DROP-OUT RATE INFORMATION (d) |  | ✓ |

FIG. 5

| Methods | AUC |
|---|---|
| LSTM-25 | 0.5958 |
| LSTM-5 | 0.6852 |
| GRU-25 | 0.5878 |
| GRU-5 | 0.6681 |
| DAS-25 | 0.6856 |
| DAS-5 | 0.7379 |

FIG. 6

| Sequence Size | AUC |
|---|---|
| 2 | 0.7145 |
| 5 | 0.7379 |
| 8 | 0.7333 |
| 10 | 0.7292 |
| 25 | 0.6856 |

| Name | Encoder Inputs | Decoder Inputs | AUC |
|---|---|---|---|
| Base | $id, c, p$ | $r, p$ | 0.6346 |
| add $st$ | $id, c, p, st$ | $r, p, st$ | 0.6653 |
| add $iot$ | $id, c, p, st$ | $r, p, st, iot$ | 0.6819 |
| add $et$ | $id, c, p, st$ | $r, p, st, iot, et$ | 0.7017 |
| add $sp, d$ | $id, c, p, st, sp$ | $r, p, st, iot, et, sp, d$ | 0.7379 |

| | QUESTION INFORMATION(E) | QUESTION RESPONSE INFORMATION(I) | RESPONSE INFORMATION(R) |
|---|---|---|---|
| QUESTION IDENTIFICATION INFORMATION | ✓ | ✓ | |
| QUESTION CATEGORY INFORMATION | ✓ | ✓ | |
| INPUT SEQUENCE POSITION INFORMATION | ✓ | ✓ | |
| RESPONSE ACCURACY INFORMATION | | ✓ | ✓ |
| ELAPSED TIME INFORMATION | | ✓ | ✓ |
| TIME RECORD INFORMATION | | ✓ | |

INPUT DATA

FIG. 15

SYSTEM FOR PREDICTING USER DROP-OUT RATE AND TRACKING USER KNOWLEDGE BASED ON ARTIFICIAL INTELLIGENCE LEARNING AND METHOD THEREFOR

CROSS-REFERENCE TO RELATED APPLICATIONS

This application claims priority to and is a 35 U.S.C. § 371 national phase application of PCT/KR2021/007459, filed on Jun. 15, 2021, entitled "System for Predicting User Drop-Out Rate and Tracking User Knowledge Based on Artificial Intelligence Learning and Method Therefor", which is incorporated herein by reference in its entirety.

TECHNICAL FIELD

The present disclosure relates to a system for predicting a user drop-out rate or tracking user knowledge based on artificial intelligence learning and an operation method thereof. Specifically, the present disclosure relates to a system for predicting a user drop-out rate and tracking user knowledge by inputting question information to an encoder neural network and inputting response information to a decoder neural network in a transformer structure.

BACKGROUND ART

Recently, in line with popular utilization of the Internet and electronic devices in every field, the educational environment is also rapidly changing. In particular, the development of various educational media enables learners to choose and use a wider range of learning methods. Among them, educational services through the Internet have played the role of a major teaching and learning method thanks to the advantages of overcoming time and space constraints and attaining low-cost education.

This online educational service is combined with various models of artificial intelligence to predict the probability of a users correct answer to a random question, which is impossible in the existing offline education environment, thereby providing more efficient learning content.

However, the users in the mobile environment are more vulnerable to various factors that cause the user to drop out of the online learning environment during learning, so dropping-out may occur more frequently in the online environment than in the offline environment. For example, whenever a call is received, a text message is received, a notification of an SNS such as Facebook or Instagram is received, or various other notifications are received, the user may drop out of the online learning content in order to check information thereof, thereby lowering the learning efficiency. Although consistent research about methods of preventing the user's dropping-out in the offline environment has been made, research on dropping-out during learning in the online environment has not yet been conducted.

Recently, a variety of artificial intelligence models such as a recurrent neural network (RNN), a long short-Term memory model (LSTM), a bidirectional LSTM, a transformer model, and the like have been proposed. The transformer model among the proposed artificial intelligence models uses only attention, instead of RNN, to produce an encoder-decoder structure, thereby providing a very fast learning speed and superior performance to RNN, so it began to be applied to the online education field.

The transformer model makes it possible to predict the probability that a user will drop out of the online learning environment or track user knowledge. However, a method for predicting a drop-out rate of the user or a correct answer probability of the user more effectively using the transformer model, such as a method of obtaining inference results optimized for predicting a user drop-out rate or tracking the user knowledge in the online learning environment depending on configuration of data input to an encoder and a decoder of the transformer model, a method of preventing the prediction of a drop-out rate or correct answer probability based on the questions that have not yet solved by the user due to the characteristics of the learning content, or the like, is required.

DISCLOSURE

Technical Problem

In order to solve the above problem, the present disclosure proposes a transformer structure-based artificial intelligence model optimized for predicting a user drop-out rate and tracking user knowledge, and an input data format thereof, thereby providing a system capable of predicting a drop-out rate and a correct answer probability of the user who learns in the mobile environment with higher accuracy, and an operation method thereof.

Technical Solution

A method of predicting a user drop-rate according to an embodiment of the present disclosure, which is an operation method of a user drop-out rate prediction system comprising a plurality of encoder neural networks and a plurality of decoder neural networks, may comprise: learning an artificial intelligence model so as to predict drop-out rate information, which is information about the probability that a user drops out while learning a learning program that is learning content provided online, on the basis of question information comprising session position information and response information of the user; and predicting the user's drop-out rate information for an input question on the basis of the learned artificial intelligence model, wherein the learning the artificial intelligence model may comprise: inputting question information to a $k^{th}$ encoder neural network and inputting response information to a $k^{th}$ decoder neural network; generating query data, which is information about a target question of which the user's dropping-out is desired to be identified, by reflecting a weight to the response information, and generating attention information to be used as a weight for the query data by reflecting a weight to the question information; and learning the user drop-out rate prediction system using the attention information as a weight for the query data, wherein the session position information may indicate a position of the question in a session, which is a learning unit distinguished according to time based on the time step at which the user's dropping-out occurs, and wherein the generating the attention information may include predicting the drop-out rate from the question previously provided to the user and response information already submitted by the user by performing upper triangular masking on the plurality of encoder neural networks and the plurality of decoder neural networks.

A method of tracking user knowledge according to an embodiment of the present disclosure, which is an operating method of a user knowledge tracking system comprising a plurality of encoder neural networks and a plurality of decoder neural networks, may comprise: inputting question information to a $k^{th}$ encoder neural network and inputting response information to a $k^{th}$ decoder neural network; generating query data, which is information about a question that is a target for predicting the probability of a user's correct answer, by reflecting a weight to the response information and generating attention information to be used as a weight for the query data by reflecting a weight to the question information; and learning the user knowledge tracking system using the attention information as a weight for the query data.

Advantageous Effects

A system and an operation method thereof according to an embodiment of the present disclosure propose a transformer structure-based artificial intelligence model optimized for predicting a user drop-out rate or user's correct answer probability, and an input data format thereof, thereby providing the effect of predicting a drop-out rate and a correct answer probability of the user who learns in the mobile environment with higher accuracy.

DESCRIPTION OF DRAWINGS

FIG. 5 is a diagram illustrating the configuration of input data of the user drop-out rate prediction system shown in FIG. 1;

FIG. 6 is a table illustrating AUCs of a user drop-out rate prediction system according to an embodiment of the present disclosure;

FIG. 15 is a diagram illustrating the configuration of input data of the user knowledge tracking system shown in FIG. 11.

MODE FOR INVENTION

Figure 1:
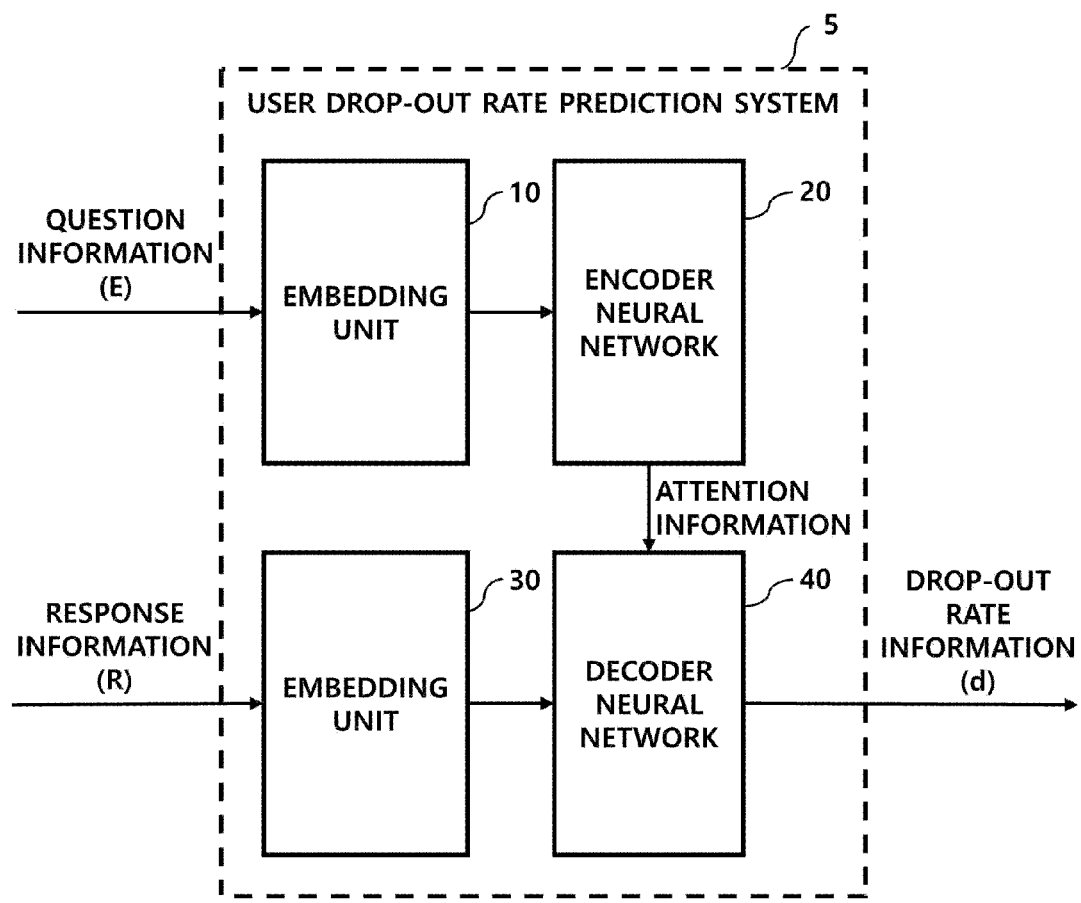
FIG. 1 is a diagram illustrating a user drop-out rate prediction system according to an embodiment of the present disclosure.

Specific structural or sequential descriptions of embodiments according to the concept of the present disclosure disclosed in this specification or application are only provided by way of example in order to explain the embodiments according to the concept of the present disclosure, and should not be construed as being limited to the embodiments described in the present specification or application so that the embodiments according to the concept of the present disclosure may be realized in various forms.

Although the embodiment according to the concept of the present disclosure may be modified in various ways and may have various forms, specific embodiments will be illustrated in the drawings, and will be described in detail in the present specification or application. However, this is not intended to limit the embodiment according to the concept of the present disclosure to a specific disclosed form, and should be understood to encompass all changes, equivalents, or substitutes included in the spirit and scope of the present disclosure.

Terms such as "first", "second", and/or the like may be used to describe various elements, but the elements are not be limited to the terms. The above terms are used only for the purpose of distinguishing one element from another element, for example, without departing from the scope of the present disclosure, a first element may be referred to as a second element, and similarly, a second element may be referred to as a first element.

In the case where one element is described as being "coupled" or "connected" to another element, it should be understood that a third element may be interposed therebetween, as well as that the two elements are directly coupled or connected to each other. On the other hand, the expression "one element is 'directly coupled' or 'directly connected' to another element" should be understood that no other element is present therebetween. Other expressions describing the relationship between elements, such as "between" and "just between", "adjacent to" and "directly adjacent to", or the like, should be interpreted in the same manner.

The terms used herein are intended to describe specific embodiments, and are not intended to limit the present disclosure. The singular expression includes the plural expression unless clearly dictated otherwise. As used herein, terms such as "include", "have", or the like are intended to specify presence of the stated features, numbers, steps, operations, elements, parts, or combinations thereof, and it should be understood that the terms do not exclude the possibility of presence or addition of one or more other features, numbers, steps, operations, elements, parts, or combinations thereof.

Unless defined otherwise, all terms used herein, including technical or scientific terms, have the same meaning as commonly understood by those skilled in the art to which the present disclosure pertains. Terms such as those defined in a commonly used dictionary should be interpreted as having a meaning consistent with the meaning in the context of the related art, and should not be interpreted as an ideal or excessively formal meaning unless explicitly defined in the present specification.

In describing the embodiment, a description of a technique that is well known in the technical field to which the present disclosure pertains and is not directly related to the present disclosure will be omitted. This is intended to more clearly convey the subject matter of the present disclosure without obscuring the same by omitting unnecessary description.

Hereinafter, the present disclosure will be described in detail by describing a preferred embodiment of the present disclosure with reference to the accompanying drawings. Hereinafter, an embodiment of the present disclosure will be described in detail with reference to the accompanying drawings.

A system according to an embodiment of the present disclosure is based on a transformer model. The artificial neural network of the system learns using the user's question solving results for large number of questions included in the question database as learning data.

According to an embodiment, the learned system predicts a user drop-out rate in the online learning environment. That is, the system predicts the probability in which the user drops out while performing learning using the online learning content. In addition, the learned system predicts the probability of a specific user's correct answer for any question included in the question database. The items to be predicted through the learned system may be selected in advance by a system administrator (not shown).

Hereinafter, as a first embodiment, a process of predicting a user drop-out rate through a learned system will be described with reference to FIGS. 1 to 10. In addition, as a second embodiment, a process of predicting the probability of a correct answer by the user through a learned system will be described with reference to FIGS. 11 to 22.

Further, for convenience of explanation, the system according to the present disclosure will be referred to as a "user drop-out rate prediction system" in the first embodiment, and the system according to the present disclosure will be referred to as a "user knowledge tracking system" in the second embodiment.

Hereinafter, a user drop-out rate prediction system and an operating method of the user drop-out rate prediction system will be described with reference to FIGS. 1 to 10.

FIG. 1 is a diagram illustrating a system for predicting a user drop-out rate according to an embodiment of the present disclosure.

Referring to FIG. 1, a user drop-out rate prediction system 5 based on a transformer model may include embedding units 10 and 30, an encoder neural network 20, and a decoder neural network 40.

The transformer model is implemented only with attention while following the encoder-decoder, which is the conventional structure of seq2seq. The transformer model does not use RNN, but maintains the encoder-decoder structure in which the encoder receives an input sequence and the decoder outputs an output sequence, like the existing seq2seq, and has characteristics in which there are N encoder and decoder units.

An attention mechanism was proposed to solve the problems of information loss and vanishing gradient that arise from compressing all information into one vector of a fixed size, which is the problem of seq2seq based on RNN.

According to the attention mechanism, all input data to the encoder is referred to once again at every time step the decoder predicts an output word. However, more attention is paid to the input data part that is related to the data to be predicted, instead of referring to all input data at the same proportion.

Referring back to FIG. 1, the user drop-out rate prediction system 5 according to an embodiment of the present disclosure may predict the probability (a drop-out rate) indicating that a user who is learning in the mobile environment/online environment terminates the learning program. Here, the learning program may indicate learning content. The learning content may be configured to include one or more questions. In addition, the learning content may be configured to further include one or more of the explanation and the lecture on the corresponding question. Hereinafter, information on the drop-out rate will be referral to as "drop-out rate information".

The drop-out rate information may be generated on the basis of time. The drop-out rate information may be updated to have different values for every hour during learning.

In addition, the drop-out rate information may be generated on the basis of the learning characteristics of the user, such as a correct answer rate to the previously solved questions, the average time for solving questions, a usual learning time, and the like, as well as the characteristics of the question itself, such as the difficulty level of the question.

Since the users in the mobile environment are more vulnerable to various factors that cause dropping-out, the dropping-out may occur more frequently in the online environment than in the offline environment.

For example, whenever a call is received, a text message is received, an SNS notification such as Facebook or Instagram is received, or various other notifications are received, the user may drop out of the online learning content in order to check information thereof, thereby lowering the learning efficiency.

Although various offline methods have been provided to prevent the dropping-out and increase the concentration of the students, these methods are limited to the offline environment and are difficult to be applied directly to the online environment, so a method for predicting the drop-out rate and increasing the concentration by reflecting the characteristics of each user in the online environment is required.

The user drop-out rate prediction system 5 according to an embodiment of the present disclosure may predict the drop-out rate on the basis of the transformer structure optimized for the online learning environment, and may use input data in a format that is optimized for prediction of the drop-out rate, thereby predicting the drop-out rate with improved accuracy.

Referring back to FIG. 1, the embedding units 10 and 30 may perform embedding for input data. In an embodiment of the present disclosure, the input data may include question information E and response information R.

The question information E may be information on various types of questions having various difficulty levels, which are provided to measure the knowledge level of the user. The question information E may include metadata of the question information E and/or the relative position of a corresponding the question in each session. The session may be a learning unit distinguished according to time based on the time step at which the user drops out.

The response information R may be information on the answer selected by the user in response to the question information E. The response information R may include information on the time taken to solve the questions given to the user, as well as the answer of the user to the question.

According to an embodiment, the question information E and the response information R may constitute a set of question-response log data. The question information E and the response information R corresponding thereto may be matched as question-response log data, and may be input into the user drop-out rate prediction system 5 as one data unit.

In an embodiment, the question information E may be expressed as "E" that is the abbreviation for "Example", the response information R may be expressed as "R" that is the abbreviation for "Response", and the drop-out rate information d may be expressed as "d" that is the abbreviation for "Dropping-out". The question-response log data may be expressed as "I" that is the abbreviation for "Interaction".

The embedding units 10 and 30 may express input data, such as questions, responses, or a set of questions and responses, as the vector to perform a function of embedding the same in the user drop-out rate prediction system 5. The input data may be expressed as the vector for a latent space in various ways. For example, one of them may be a method in which words are quantified and used by artificial intelligence. Even if the user inputs different expressions or forms, the meanings of words, sentences, and text may be expressed by calculating correlation thereof and representing the same using numerical values.

As will be described later with reference to FIG. 5, the question information E may be calculated by summating the embedding of one or more pieces of question identification information, question category information, start time information, input sequence position information, and session position information. The response information R may be calculated by summating the embedding of one or more pieces of start time information, input sequence position information, session position information, response accuracy information, elapsed time information, input-on-time information, and drop-out rate information.

The question information E expressed as the vector may be embedded by the embedding unit 10, and may be input into the encoder neural network 20. The response information R expressed as the vector may be embedded by the embedding unit 30, and may be input into the decoder neural network 40.

The encoder neural network 20 may generate attention information on the basis of the embedded question information E. The attention information may be question information weighted while passing through a plurality of layers of the encoder neural network 20. In particular, the attention information may be information generated through self-attention in the encoder neural network 20. The attention information may be mathematically expressed as a probability, and the sum of all attention information is 1.

The attention information may be input into the decoder neural network 40, may be used as a weight for query data of the decoder neural network 40, and may be used to train the user drop-out rate prediction system 5.

An artificial neural network may utilize the attention information in order to learn which portion is important in conformance to an objective function. In particular, self-attention may indicate that attention is paid to oneself, and may be an operation of applying a weight to the portion to be considered important in specific data and reflecting the same back to the data. In the attention of the existing seq2seq, since the correlation is obtained using information on different data, i.e., data of the encoder and data of the decoder, it is impossible to obtain the information according to self-attention in the attention structure of the conventional seq2seq.

The user drop-out rate prediction system 5 may refer to again all input data E1, E2, . . . , Ek, R1, R2, . . . , and Rk−1 with respect to the encoder neural network 20 at every time step of predicting an output result dk* of the decoder neural network 40, and may pay attention to the data related to the corresponding output result depending on the attention information.

The decoder neural network 40 may generate drop-out rate information d on the basis of the embedded response information R and the attention information. The decoder neural network 40 may perform multi-head attention, in which aforementioned self-attention is performed one time or more, on the response information R.

As described above, the decoder neural network 40 may perform multi-head attention on query data generated from response information R on the basis of the attention information to which a weight is applied depending on the importance in the question information E by the encoder neural network 20, thereby generating drop-out rate information d.

According to an embodiment of the present disclosure, by using question information E in the encoder and response information R in the decoder, as input data optimized for prediction of the user drop-out rate, it is possible to implement a user drop-out rate prediction system 5 with more improved performance. The user drop-out rate prediction system 5 may train the user drop-out rate prediction system 5 capable of predicting the drop-out rate using the question information E and the response information R as input data. Thereafter, the user drop-out rate prediction system 5 may output drop-out rate information d from the learned user drop-out rate prediction system 5. This is an inference process for outputting drop-out rate information d indicating the probability in which the user drops out when solving a corresponding question, listening to or watching an explanation or lecture, or the like by processing input data depending on the weight determined in the learning process.

In addition, the present disclosure may implement a user drop-out rate prediction system 5 capable of preventing prediction of the drop-out rate on the basis of the question that has not yet been solved by the user using upper triangular masking in the encoder neural network 20 and the decoder neural network 40 of the transformer structure optimized for the online learning environment.

Figure 2:
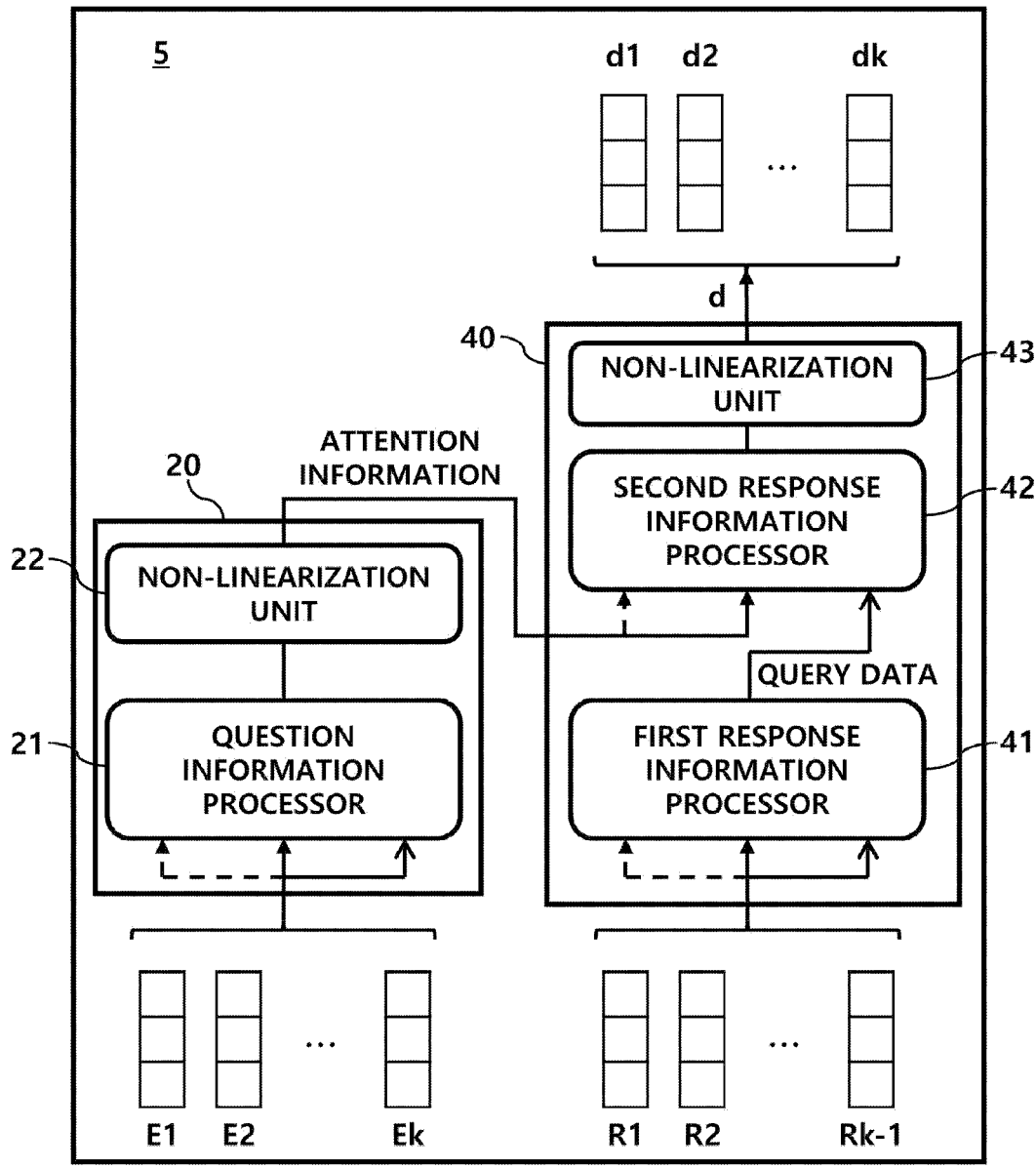
FIG. 2 is a diagram illustrating the detailed operation of the user drop-out rate prediction system in FIG. 1.

FIG. 2 is a diagram illustrating the detailed operation of the user drop-out rate prediction system 5 in FIG. 1.

Referring to FIG. 2, the user drop-out rate prediction system 5 may include the encoder neural network 20, and the decoder neural network 40. The encoder neural network 20 may include a question information processor 21 and a non-linearization unit 22. In addition, the decoder neural network 40 may include a first response information processor 41, a second response information processor 42, and a non-linearization unit 43.

Although the embedding units 10 and 30 in FIG. 1 are omitted from FIG. 2, the embedding operation for input data may be understood with reference to the description above in FIG. 1.

The question information E may include a plurality of questions E1, E2, . . . , and Ek expressed as vectors. The response information R may include responses R1, R1, . . . , and Rk−1 of the user to the respective questions E1, E2, . . . , and Ek expressed as vectors. The drop-out rate information d may include respective drop-out rate information d1, d2, . . . , and dk indicating the drop-out probability of the user for the respective questions expressed as vectors.

In an embodiment, the drop-out rate information dk may be information on the probability of dropping out of the learning program while the user is solving the question Ek in the case where a user response to the question E1 is R1, a user response to the question E2 is R2, . . . , and a user response to the question Ek−1 is Rk−1.

Although the drop-out rate information has been described as the information on the probability of the user terminating the learning program while solving the questions, according to an embodiment, the drop-out rate information may include the probability of terminating the learning program while the user is reading the explanation on the solved question or watching the lecture therefor.

In this case, drop-out rate information may be generated, which indicates the probability of the user dropping out of the learning program at the time exceeding the time of completion of question solving from the time at which the question is provided to the use. This will be described in detail later with reference to FIG. 3.

The question information processor 21 may receive question information E, and may perform a series of operations related to self-attention. The operations may include dividing the question information E into queries, keys, and values, generating a plurality of head values for the respective values, generating a weight from a plurality of query head values and a plurality of key head values, performing masking on the generated weight, and applying the masked weight to the plurality of value head values, thereby generating prediction data.

The prediction data generated in the question information processor 21 may be attention information.

In particular, the question information processor 21 may perform upper triangular masking, as well as the key-query masking, during the masking operation. The key-query masking and the upper triangular masking will be described in detail later with reference to FIG. 4.

The non-linearization unit 22 may perform non-linearization of the prediction data output from the question information processor 21. ReLU function may be used in the non-linearization.

Although not shown in the drawing, one or more encoder neural networks 20 may be provided. Attention information generated in the encoder neural network 20 may be input back into the encoder neural network 20 so that a series of operations related to the self-attention and the non-linearization may be repeated several times.

Thereafter, the attention information may be divided into a key and a value to then be input into the second response information processor 42. The attention information may be used as the weight for query data, which is input into the second response information processor 42, and may be used to train the user knowledge drop-out rate prediction system 5.

The first response information processor 41 may receive response information R, and may perform a series of operations related to the self-attention, similarly to the question information processor 21. The operations may include dividing the question information E into queries, keys, and values, generating a plurality of head values for the respective values, generating a weight from a plurality of query head values and a plurality of key head values, performing masking on the generated weight, and applying the masked weight to the plurality of value head values, thereby generating prediction data.

The prediction data generated in the first response information processor 41 may be query data.

The second response information processor 42 may receive query data from the first response information processor 41, may receive attention information from the encoder neural network 20, and may output drop-out rate information d.

Attention information may be input into the decoder neural network 40 to then be used as a weight for query data of the decoder, and may be used to train the user drop-out rate prediction system 5.

The attention information may be information on a weight provided in order to intensively consider a specific area of query data. Specifically, the user drop-out rate prediction system 5 may refer to again all input data E1, E2, . . . , Ek, R1, R2, . . . , and Rk−1 with respect to the encoder neural network 20 at every time step of predicting an output result d of the decoder neural network 40, and may pay attention to the data related to the corresponding output result.

The second response information processor 42 may generate dk, which is user drop-out rate information for question information Ek according to the above operation.

Although not shown in the drawing, one or more decoder neural networks 40 may be provided. The drop-out rate information generated in the decoder neural networks 40 may be input back into the decoder neural networks 40 so that a series of operations related to the self-attention, the multi-head attention, and the non-linearization may be repeated several times.

Like the question information processor 21, the first response information processor 41 and the second response information processor 42 may perform upper triangular masking, as well as key-query masking, during the masking operation.

Figure 3:
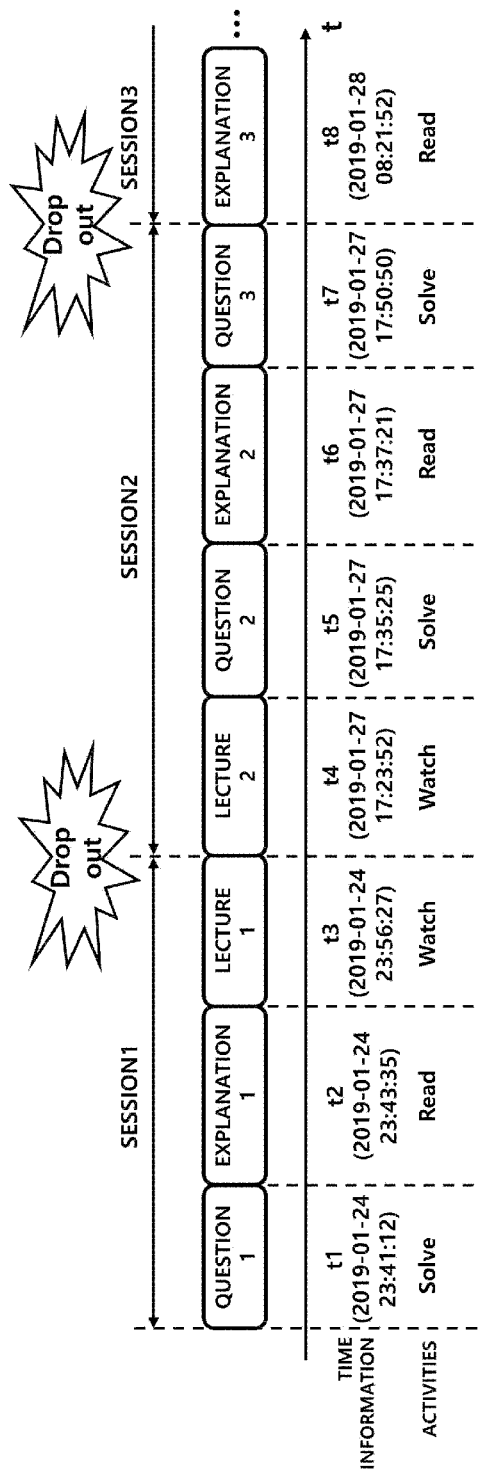
FIG. 3 is a diagram illustrating dropping-out according to an embodiment of the present disclosure.

FIG. 3 is a diagram illustrating dropping-out according to an embodiment of the present disclosure.

Referring to FIG. 3, the user may solve given question (question 1, question 2, and question 3), may read explanations (explanation 1, explanation 2, and explanation 3), and may watch lectures (lecture 1 and lecture 2).

In FIG. 3, the explanation and the lectures for question 1 may be explanation 1, lecture 1, and lecture 2, the explanation for question 2 may be explanation 2, and the explanation for question 3 may be explanation 3. The number of explanations and lectures for each question is not limited, any one of the explanations and the lectures may be omitted, or a plurality of explanations or lectures may be provided.

In addition, although the explanation is described as being read and the lecture is described as being watched, five human senses may be utilized variously in consideration of the learning efficiency according to an embodiment.

In FIG. 3, time information may indicate the time at which each activity starts, the time at which the activity ends, the midpoint between the start time and the end time, or the time selected according to predetermined criteria between the start and the end. Hereinafter, a description will be made on the assumption that the time information indicates the time at which each activity starts.

In an embodiment, the user may begin to solve question 1 at t1. After the solving of question 1 is finished at t2, the learning program may provide explanation 1 and lecture 1. Explanation 1 may be provided until t3, and then lecture 1 may be provided.

The user may drop out of the learning program at t4. The dropping-out may include a variety of situations in which the user no longer uses the learning program, such as the case where the screen of a mobile device is turned off, the case where the learning program switches to the background state as another application is executed, the case where the mobile device is turned off, or the like, as well as the case where the user directly terminates the learning program.

In addition, the dropping-out may be determined even in the case where the user does not perform any activity (e.g., the state in which no input received from the user while the learning program is running) for a predetermined time or more. If the dropping-out of the user is defined on the basis of the time during which the user does not perform any activity, the session may be defined as a learning unit divided according to the time on the basis of the time at which the dropping-out of the user occurs.

For example, the embodiment in FIG. 3 shows the case in which the predetermined time is one hour, and in this case, the session may be defined as a series of learning activities in which the time interval between adjacent activities is less than one hour, and the dropping-out may be defined as the state in which the user does not perform any activity for one hour or more.

The predetermined time may be variously configured in addition to one hour, and may be configured differently for each question depending on the question type (or category). For example, the listening part may be configured to have a shorter time than the reading part in the TOEIC test, the longer the passage, the longer the time in the same listening part, and the shorter the passage, the shorter the time in the same reading part.

If the user drops out of the learning program at t4, the learning program may save the state of lecture 1 that is being played at the drop-out time t4. Thereafter, if the user executes the learning program again, the automatically saved lecture may be played from the drop-out time t4. The replayed lecture may be lecture 2.

According to the process described above, lecture 2, question 2, explanation 2, and question 3 may be provided to the user. Since more than one hour has elapsed after t7 at which question 3 is provided until t8 at which explanation 3 is provided as a subsequent activity, the user drop-out rate prediction system 5 may determine that the user has dropped out.

The user drop-out rate prediction system 5 may predict the dropping-out of the user in advance using the artificial intelligence model, and may provide user-customized learning data. As described above, since the dropping-out of the user may occur even while the explanations or the lectures are provided after the question is solved, the user drop-out rate prediction system 5 may predict the drop-out time irrespective of the time for solving the question by the user.

Figure 4:
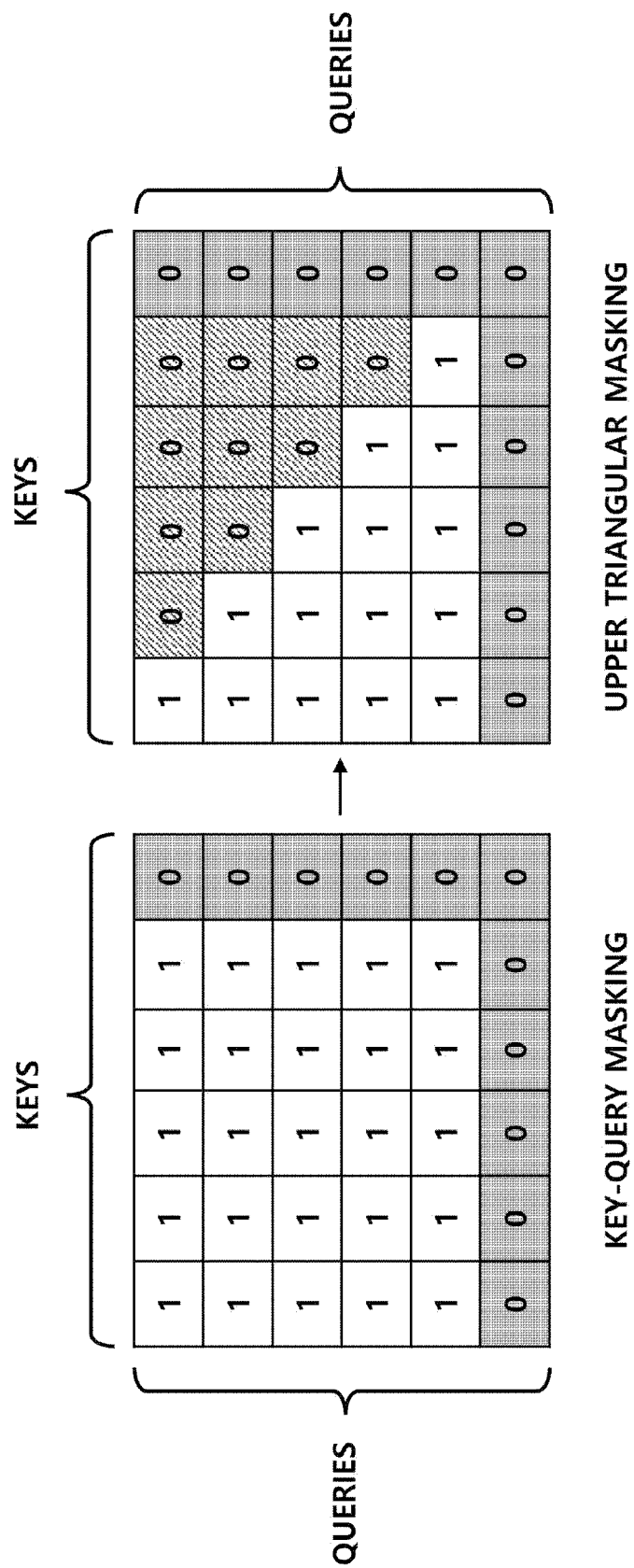
FIG. 4 is a diagram illustrating key-query masking and upper triangular masking.

FIG. 4 is a diagram illustrating key-query masking and upper triangular masking.

Although FIG. 4 illustrates that upper triangular masking is performed after key-query masking, both may be performed simultaneously, or the upper triangular masking may be performed first.

The key-query masking may be an operation of preventing execution of the attention by imposing the penalty to the null value (zero padding) as an optional choice. The value of prediction data in which key-query masking was performed may be expressed as 0, and the remaining portions may be expressed as 1.

Although the last values of the queries and keys are masked for the convenience of description in the key-query masking in FIG. 4, this may be variously changed according to an embodiment.

The upper triangular masking may be an operation of preventing execution of the attention by the information corresponding to the future position for the prediction of a subsequent question. For example, this may be a masking operation in order to prevent a prediction value from being calculated on the basis of the question that the user has not yet solved. Like the key-query masking, the value of prediction data in which the upper triangular masking was performed may be expressed as 0, and the remaining portions may be expressed as 1.

Then, the values of the masked prediction data may be controlled to have the probability close to zero when they are probabilistically expressed through the Softmax function by reflecting an arbitrarily large negative number.

In the conventional transformer structure, the key-query masking is performed in the encoder neural network, and the upper triangular masking is performed together with the key-query masking in the decoder neural network. In the user drop-out rate prediction system 5 of the present disclosure, the upper triangular masking may be performed both in the encoder neural network 20 and in the decoder neural network 40, so that the drop-out rate information is able to be controlled to rely only on the question information E1, E2, . . . , and Ek previously provided to the user and the response information R1, R2, . . . , and Rk-1 that the user has already submitted.

FIG. 5 is a diagram illustrating the configuration of input data of the user drop-out rate prediction system shown in FIG. 1.

Referring to FIG. 5, input data may include question information E and response information R. In this case, the question information E may be input into the encoder neural network 20 of the user drop-out rate prediction system 5, and the response information R may be input into the decoder neural network 40 of the user drop-out rate prediction system 5.

Question identification information may be a unique value assigned to each question. The user or a computer may identify a corresponding question through the question identification information.

Question category information may be information indicating the type of question. For example, in the TOEIC test question, the question category may be information indicating whether the question relates to a listening part or a reading part.

Start time information may be the time at which the user first encounters a given question. That is, this may be the time at which the question is provided to the user.

Input sequence position information may be information indicating the position of a corresponding question or a response to the corresponding question in the overall question sequence or overall response sequence. Unlike the RNN structure, since the sequence of input data is not indicated in the transformer structure, it is necessary to separately indicate the position of each piece of data within the overall data sequence in order to distinguish the sequence thereof. The input sequence position information may be embedded together with input data, and may be added to the embedded input data, thereby being input into the encoder neural network 20 and the decoder neural network 40.

Session position information may be information indicating the position of the question or response in the session. The session position information may be counted by 1 for every question, and in the case of moving on to the next session, the session position information may be initialized to 1, and may be counted again from 1.

Response accuracy information may be information indicating whether the response of the user is a correct answer or a wrong answer. For example, if the response of the user is a correct answer, the response accuracy information may have index "1", whereas if the response of the user is a wrong answer, the response accuracy information may have index "0". In addition, the index may be mapped to a vector.

Elapsed time information may be information obtained by converting the time taken in order for the user to solve the question into a vector. The elapsed time information may be expressed in seconds, minutes, hours, or the like, and if a predetermined time (e.g., 300 seconds) elapses, it may be determined that a corresponding time (300 seconds) has elapsed.

Input-on-time information may be information on whether or not the user responds within a limited time suggested by a domain expert. The input-on-time information may have index "1" if it is true. Otherwise, the input-on-time information may have index "0". In addition, the index may be mapped to a vector.

Drop-out rate information may be information indicating whether or not the user drops out while solving a corresponding question, reading an explanation, or watching a lecture. The drop-out rate information may have index "1" if it is true. Otherwise, the drop-out rate information may have index "0". In addition, the index may be mapped to a vector.

As shown in FIG. 5, question information E may include question identification information, question category information, start time information, input sequence position information, and session position information. However, the question information is not limited thereto, and may exclude any one of them, or may further include other information according to an embodiment.

Response information R may include start time information, input sequence position information, session position information, response accuracy information, elapsed time information, input-on-time information, and drop-out rate information. However, the response information is not limited thereto, and may exclude any one of them, or may further include other information according to an embodiment.

Although not shown in the table, the question-response log data I may include question identification information, question category information, start time information, input sequence position information, session position information, response accuracy information, elapsed time information, input-on-time information, and drop-out rate information. However, the question-response log data is not limited thereto, and may exclude any one of them, or may further include other information according to an embodiment.

The user drop-out rate prediction system 5 according to an embodiment of the present disclosure may input the question information E configured as the above-described data format into the encoder neural network 20 of the user drop-out rate prediction system 5, and may input the response information R configured as the above-described data format into the decoder neural network 40 of the user drop-out rate prediction system 5 to generate drop-out rate information, thereby providing the effect of predicting a drop-out rate with improved accuracy.

FIG. 6 is a table illustrating AUC of a user drop-out rate prediction system 5 according to an embodiment of the present disclosure.

Deep attentive study session dropout prediction in mobile learning environment (DAS) may be a term indicating the user drop-out rate prediction system 5 of the present disclosure. An area under the receiver operating characteristic curve (AUC) is a value indicating the ratio of correct prediction to overall prediction. The AUC is the value indicating the sensitivity depending on the specificity, and the higher the AUC, the higher the prediction accuracy.

Referring to FIG. 6, it can be seen that AUCs of the DAS are higher than those of various artificial neural network models (LSTM and GRU).

In particular, when the sequence size is 5 (DAS-5), the AUC is 0.7379, and when the sequence size is 25 (DAS-25), the AUC is 0.6856, so it is confirmed that accuracy of DAS-5 is higher than that of DAS-25.

Figure 7:
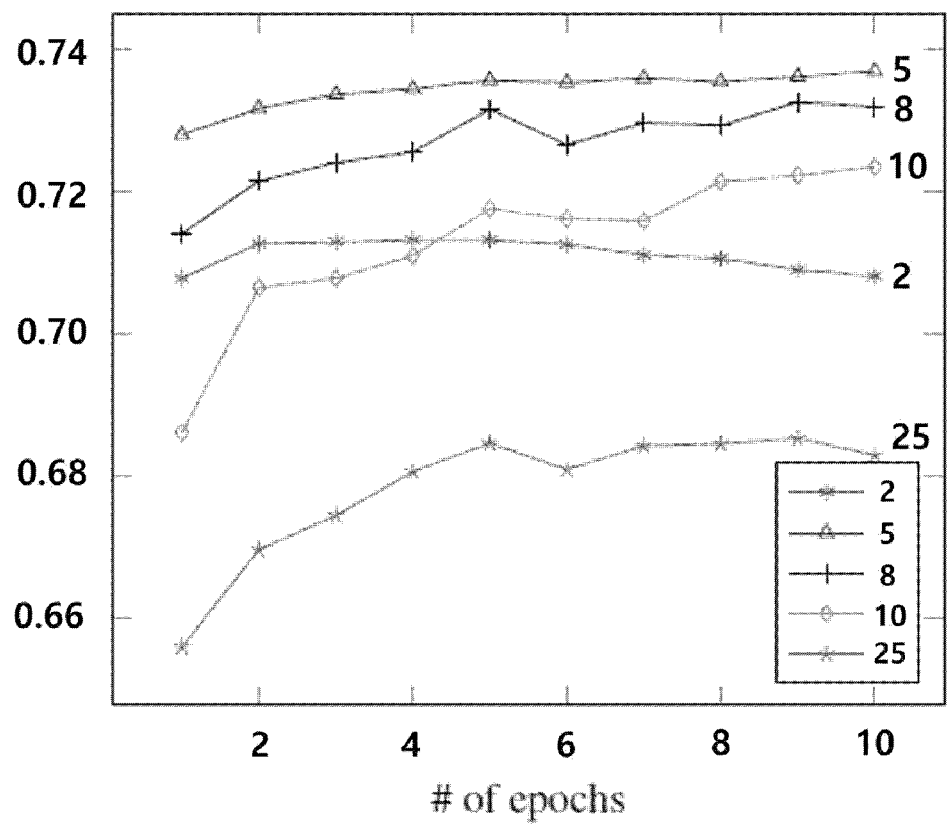
FIG. 7 is a graph illustrating AUCs of a user drop-out rate prediction system depending on a sequence size of input data.

FIG. 7 is a graph illustrating AUCs of a user drop-out rate prediction system 5 depending on a sequence size of input data.

The question information E and the response information R, as input data, may be configured as various sequence sizes. FIG. 7 is a graph showing AUCs depending on a sequence size.

Referring to FIG. 7, when the sequence size is 5, the AUC is 0.7379, which enables implementation of the user drop-out rate prediction system 5 having the highest accuracy.

Figure 8:
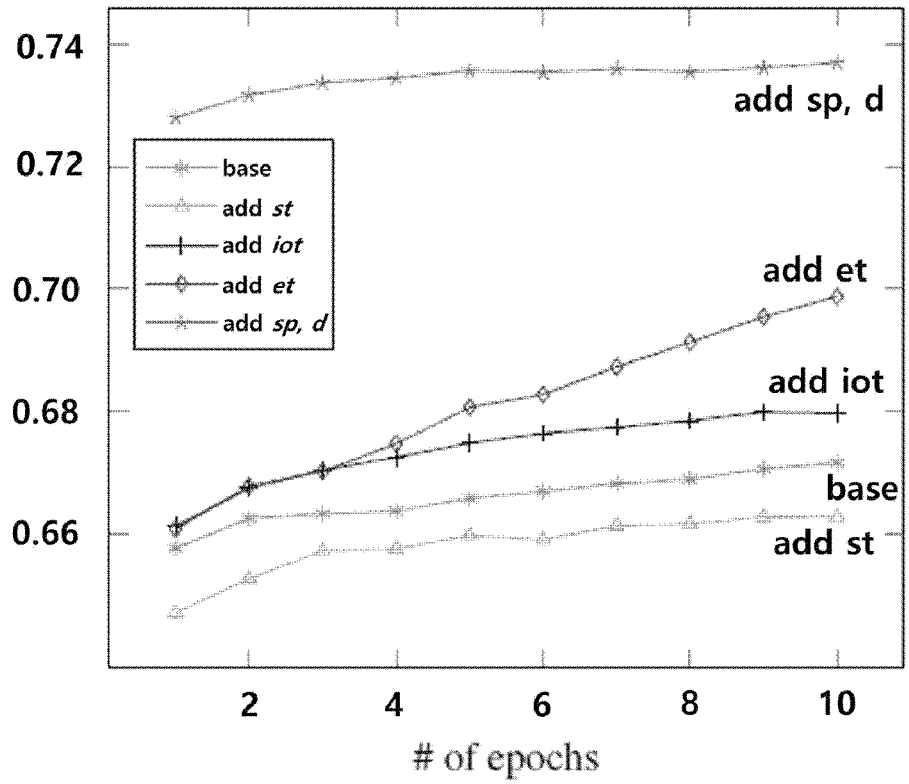
FIG. 8 is a graph illustrating AUCs of a user drop-out rate prediction system depending on a format of input data.

FIG. 8 is a graph illustrating AUCs of a user drop-out rate prediction system 5 depending on a format of input data.

The abbreviation in FIG. 8 may be understood with reference to FIG. 5 described above. Specifically, "id" may indicate question identification information, "c" may indicate question category information, "st" may indicate start time information, "p" may indicate input sequence position information, "sp" may indicate session position information, "r" may indicate response accuracy information, "et" may indicate elapsed time information, "iot" may indicate input-on-time information, and "d" may indicate drop-out rate information.

Referring to FIG. 5 and FIG. 8, in base, when the question information E input into the encoder neural network 20 includes question identification information id, question category information c, and input sequence position information p, and the response information R input into the decoder neural network 40 includes response accuracy information r and input sequence position information p, AUC may be 0.6346.

In this case, if start time information st is further added to the question information E, and if start time information st, input-on-time information iot, and elapsed time information et are sequentially added to the response information R, the AUCs may be 0.6653, 0.6819, and 0.7017, respectively.

Here, when session position information sp is added to the question information E, and if session position information sp and drop-out rate information d are added to the response information R, the AUC may be 0.7379.

Summarizing the above description, it is possible to implement the user drop-out rate prediction system 5 having the highest accuracy when the question information E includes question identification information id, question category information c, start time information st, input sequence position information p, and session position information sp, and when the response information R includes start time information st, input sequence position information p, session position information sp, response accuracy information r, elapsed time information et, input-on-time information iot, and drop-out rate information d.

Figure 9:
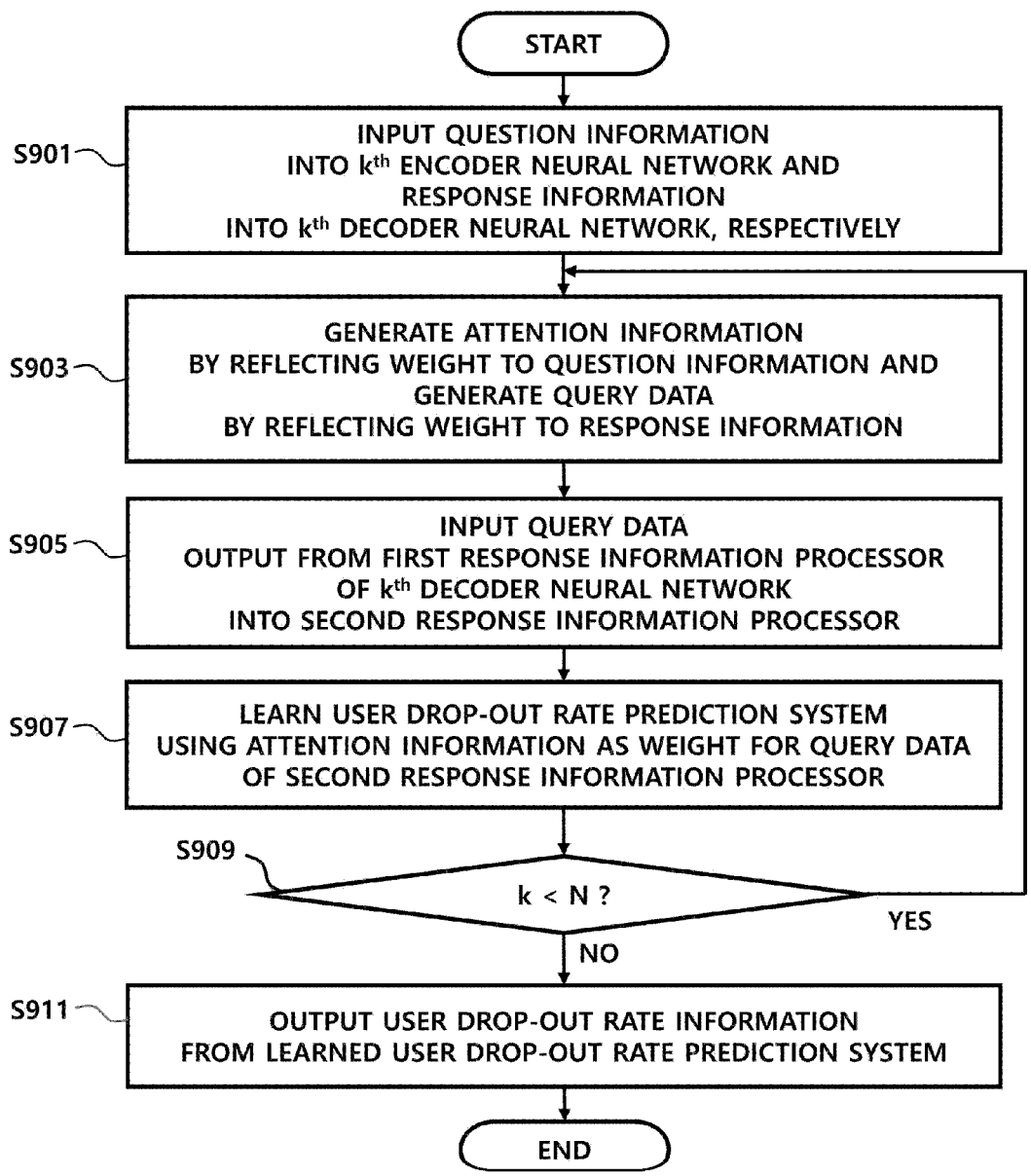
FIG. 9 is a flowchart illustrating the operation of the user drop-out rate prediction system shown in FIG. 1.

FIG. 9 is a flowchart illustrating the operation of the user drop-out rate prediction system 5 used in FIG. 1.

Referring to FIG. 9, in step S901, the user drop-out rate prediction system 5 may input question information E into a $k^{th}$ encoder neural network 20, and may input response information R into a $k^{th}$ decoder neural network 40, respectively.

The question information E may include question identification information id, question category information c, start time information st, input sequence position information p, and session position information sp (see FIG. 5). The response information R may include start time information st, input sequence position information p, session position information sp, response accuracy information r, elapsed time information et, input-on-time information iot, and drop-out rate information d (see FIG. 5). However, the question information and the response information are not limited thereto, and may exclude some of them, or may further include other information according to an embodiment.

In step S903, the user drop-out rate prediction system 5 may generate attention information by reflecting a weight to the question information E, and may generate query data by reflecting a weight to the response information R.

Specifically, the question information E may reflect a weight to the question information E through self-attention. The self-attention may be an operation of applying a weight to the portion to be considered important in specific data and reflecting the same back to the data.

The weight may be reflected to the response information R by performing multi-head attention based on attention information, as well as the self-attention.

In step S905, query data output from the first response information processor 41 of the $k^{th}$ decoder neural network 40 may be input into the second response information processor 42. The query data may be prediction data output from the first response information processor 41.

In step S907, the user drop-out rate prediction system 5 may use attention information as a weight for the query data of the second response information processor 42, thereby training the user drop-out rate prediction system 5.

In step S909, the user drop-out rate prediction system 5 may compare k with N, and if k is equal to N, may perform step S911, and if k is smaller than N, may return to step S903 to repeat step S903 to step S907.

Since the encoder neural network 20 and the decoder neural network 40 may be stacked as many as N, the above process may be repeated until a series of operations including the self-attention and the multi-head attention for all the stacked encoder neural networks 20 and decoder neural networks 40 are completed.

In step S911, the user drop-out rate prediction system 5 may output drop-out rate information from the learned user drop-out rate prediction system 5.

This is an inference process for outputting drop-out rate information indicating the probability in which the user drops out when solving a corresponding question, listening to or watching an explanation or lecture, or the like by processing input data depending on the weight determined in the learning process.

Figure 10:
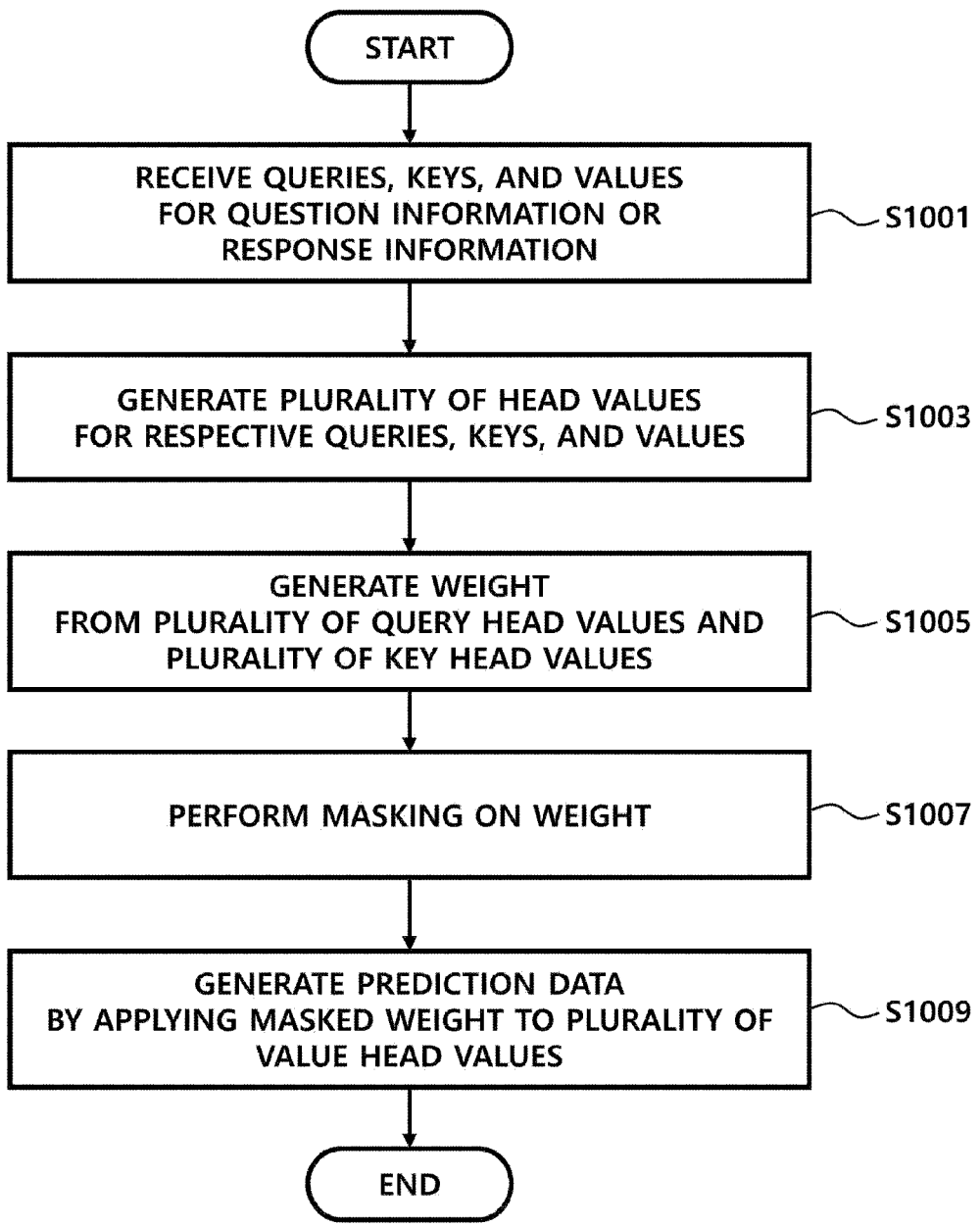
FIG. 10 is a flowchart illustrating the detailed operation of a question information processor or a response information processor of the user drop-out rate prediction system shown in FIG. 2.

FIG. 10 is a flowchart illustrating the detailed operation of a question information processor 21 or a response information processor 41 or 42 of the user drop-out rate prediction system 5 shown in FIG. 2.

Referring to FIG. 10, in step S1001, each element may receive queries, keys, and values for the question information E or the response information R. Each value may be expressed as a vector, and may be divided according to the role of usage.

In step S1003, each element may generate a plurality of head values for the respective queries, keys, and values.

Each element may generate a weight from a plurality of query head values and a plurality of key head values in step S1005, and may perform a masking operation including key-query masking and upper triangular masking in step S1007.

The key-query masking may be an operation of preventing execution of the attention by imposing the penalty to the null value (zero padding) as an optional choice. The value of prediction data in which key-query masking was performed may be expressed as 0, and the remaining portions may be expressed as 1.

The upper triangular masking may be an operation of preventing execution of the attention by the information corresponding to the future position for the prediction of a drop-out rate for a subsequent question. For example, this may be a masking operation of preventing execution of attention for the question that the user has not yet solved in order to prevent prediction of drop-out rate information d from the question that has not yet been solved. Like the key-query masking, the value of prediction data in which the upper triangular masking was performed may be expressed as 0, and the remaining portions may be expressed as 1.

Thereafter, in step S1009, prediction data may be generated by applying the masked weight to the plurality of value head values.

The prediction data generated in the question information processor 21 may be attention information, the prediction data generated in the first response information processor 41 may be query data, and the prediction data generated in the second response information processor 42 may be drop-out rate information d.

The user drop-out rate prediction system 5 according to the present disclosure may use an optimized input data format, and may perform upper triangular masking both on the encoder neural network 20 and on the decoder neural network 40 in the transformer structure, thereby obtaining improved performance. Hereinafter, a user knowledge tracking system and an operation method of the user knowledge tracking system will be described with reference to FIGS. 11 to 23.

Figure 11:
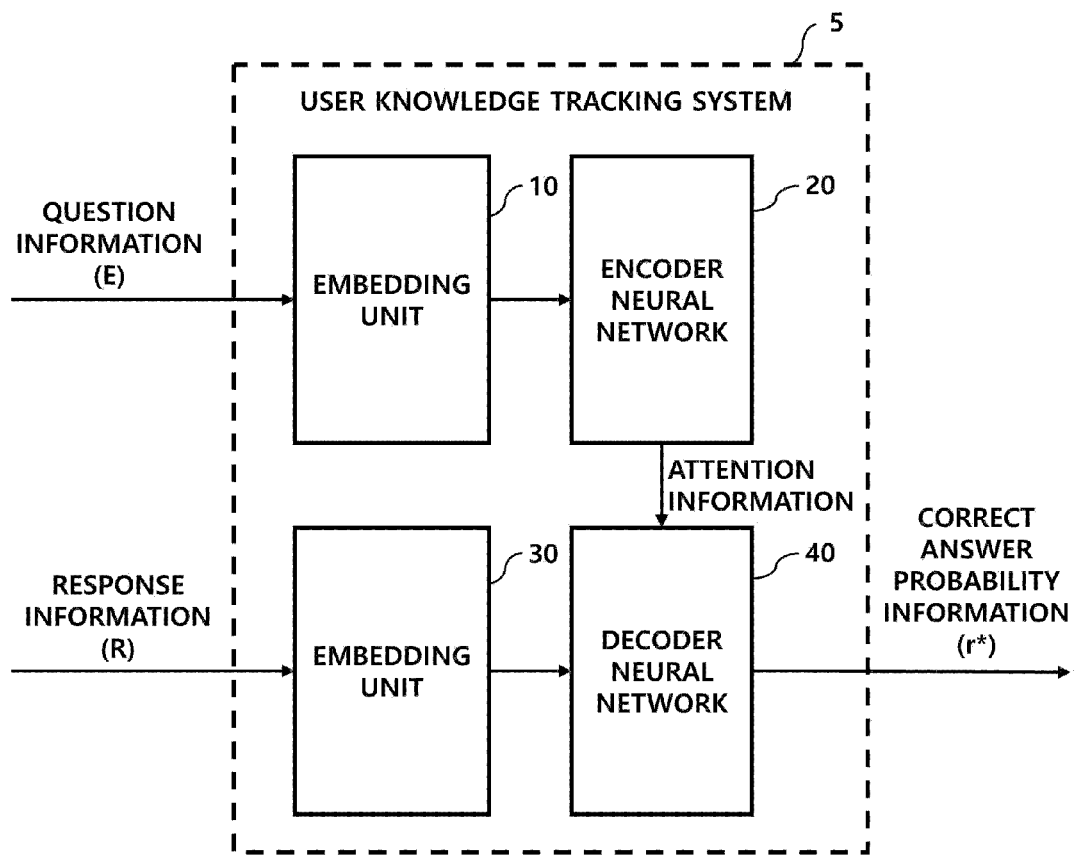
FIG. 11 is a diagram illustrating a user knowledge tracking system according to an embodiment of the present disclosure.

FIG. 11 is a diagram illustrating a user knowledge tracking system according to an embodiment of the present disclosure.

Referring to FIG. 11, the user knowledge tracking system 5 based on the transformer model may include embedding units 10 and 30, an encoder neural network 20, and a decoder neural network 40.

The user knowledge tracking system 5 may learn an artificial neural network on the basis of results of solving a large number of questions in the question database by a user and predict the correct answer probability of a specific user to any question included in the question database on the basis of the trained artificial neural network.

It may be inefficient to provide a question that the user can answer with certainty in an educational domain aiming at the user's academic progress. It would be efficient to provide a question that the user is more likely to fail to answer or a question that helps to raise a target test score.

The user knowledge tracking system 5 according to an embodiment of the present disclosure may generate a user model that more accurately reflects user characteristics, thereby providing the user with a question having high learning efficiency, that is, a question to which the user is particularly vulnerable by analyzing in real time the type of a question that the user is more likely to fail to answer, that helps to raise a target test score, or to which the user repeatedly gives a wrong answer.

In addition, the user knowledge tracking system 5 may learn an artificial neural network on the basis of results of solving a large number of questions in the question database, and may predict the score that a specific user will get on a real exam on the basis of the learned artificial neural network. It is possible to provide a user-customized learning design according to the predicted score range, which enables the user to perform more efficient learning.

Referring to FIG. 11, the embedding units 10 and 30 may perform embedding on input data. In an embodiment of the present disclosure, input data may include question information E and response information R. Alternatively, the input data may include question information E and question response information (see the reference numeral "I" in FIG. 15).

The question information E may be information on various types of questions having various difficulty levels, which are provided to measure the knowledge level of the user.

The response information R may be information on the answer selected by the user in response to the question information or information on whether the user's answer to the question is correct or wrong.

The question response information I may be information about a set in which the question information E and the user's response information R thereto are matched.

In an embodiment, the question information E may be expressed as "E" that is the abbreviation of "Example", the response information R may be expressed as "R" that is the abbreviation of "Response", and the question response information I may be expressed as "I" that is the abbreviation of "Interaction". Correct answer probability information may be expressed as "r*".

The embedding units 10 and 30 may express input data, such as questions, responses, or a set of questions and responses, as a vector to perform a function of embedding the same in the user knowledge tracking system 5. The input data may be expressed as a vector for a latent space in various ways. For example, one of them may be a method in which words are quantified and used by artificial intelligence. Even if the user inputs different expressions or forms, the meanings of words, sentences, and text may be expressed by calculating correlation thereof and representing the same using numerical values.

The question information E expressed as a vector may be embedded in the embedding unit 10, and may be input to the encoder neural network 20. The response information R expressed as a vector may be embedded in the embedding unit 30, and may be input to the decoder neural network 40.

According to an embodiment of the present disclosure, a user knowledge tracking system 5 having improved performance may be provided by inputting question information E to an encoder and inputting response information R to a decoder as input data of a transformer model optimized for online learning content.

The encoder neural network 20 may generate attention information on the basis of the embedded question information E. The attention information may be question information weighted through a plurality of layers of the encoder neural network 20. In particular, the attention information may be information generated through self-attention in the encoder neural network 20. The attention information may be mathematically expressed as a probability, and the sum of all attention information is 1. The attention information is input to the decoder neural network 40 and is used as a weight for query data of the decoder neural network 40 so as to be used to train the user knowledge tracking system 5.

An artificial neural network may utilize the attention information in order to learn which portion is important in conformance to an objective function. In particular, self-attention may indicate that attention is paid to oneself, and may be an operation of applying a weight to the portion to be considered important in specific data and reflecting the same back to oneself. In the attention of the existing seq2seq, since the correlation is obtained using information on different data, i.e., data of the encoder and data of the decoder, it is impossible to obtain the information according to self-attention in the attention structure of the conventional seq2seq.

The user knowledge tracking system 5 may refer to again all input data E1, E2, . . . , Ek, R1, R2, . . . , and Rk-1 with respect to the encoder neural network 20 at every time step of predicting an output result rk* of the decoder neural network 40, and may pay attention to the data related to the corresponding output result depending on the attention information.

The decoder neural network 40 may generate a response prediction result on the basis of the embedded response information R and attention information. The decoder neural network 40 may perform multi-head attention, in which aforementioned self-attention is performed one time or more, on the response information R.

As described above, the decoder neural network 40 may perform multi-head attention on query data generated from response information R on the basis of the attention information to which a weight is applied depending on the importance in the question information E by the encoder neural network 20, thereby generating correct answer probability information r*.

According to an embodiment of the present disclosure, a user knowledge tracking system 5 with improved performance may be provided by inputting question information E to the encoder and inputting response information R to the decoder as input data optimized for user knowledge tracking.

In addition, the present disclosure may provide a user knowledge tracking system 5 with improved performance by appropriately using upper triangular masking in the encoder neural network 20 and the decoder neural network 40 of a transformer structure optimized for an online learning environment.

Figure 12:
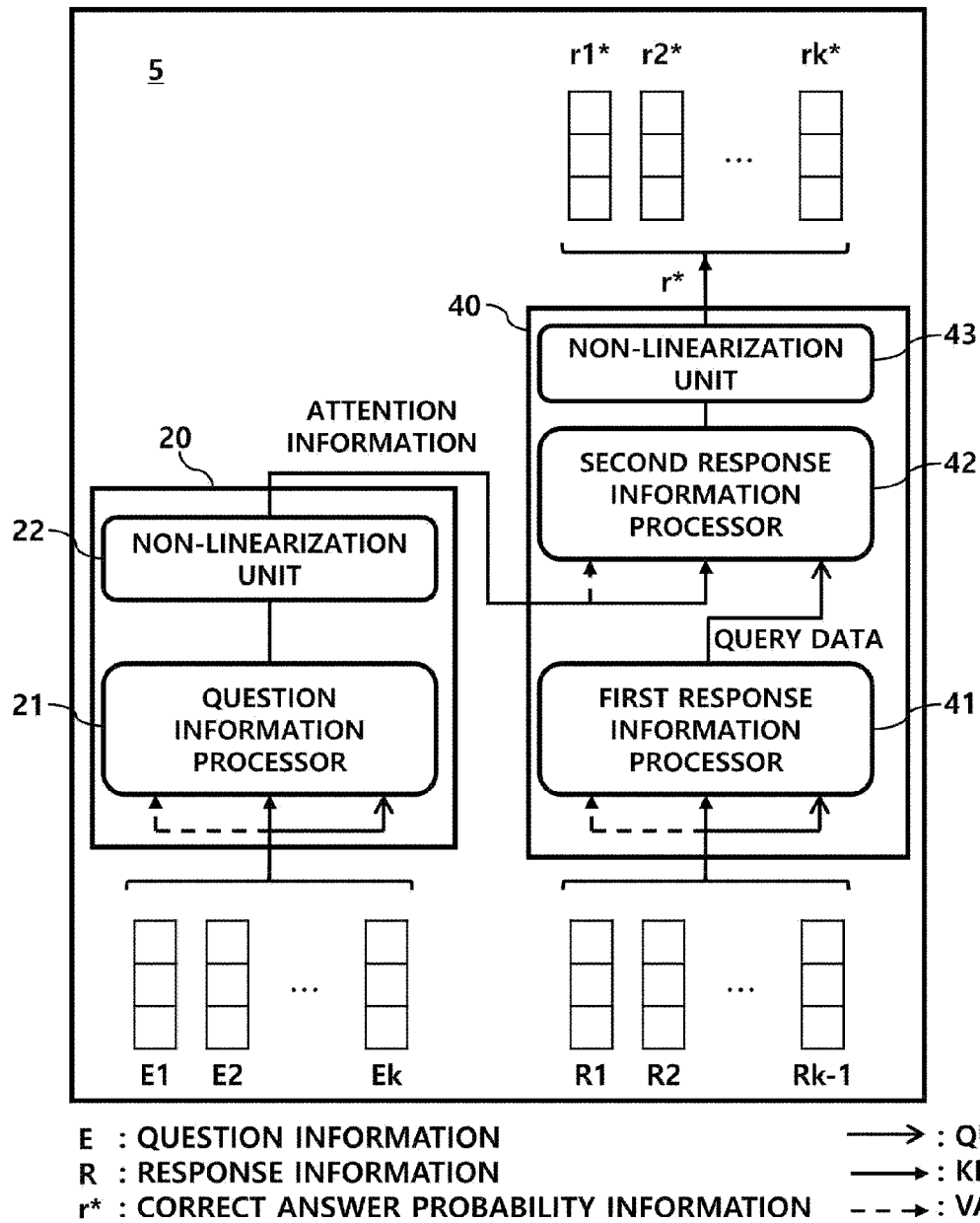
FIG. 12 is a diagram illustrating in detail the operation of the user knowledge tracking system shown in FIG. 11.

FIG. 12 is a diagram illustrating in detail the operation of the user knowledge tracking system 5 shown in FIG. 11.

Referring to FIG. 12, the user knowledge tracking system 5 may include an encoder neural network 20 and a decoder neural network 40. The encoder neural network 20 may include a question processor 21 and a non-linearization unit 22. In addition, the decoder neural network 40 may include a first response information processor 41, a second response information processor 42, and a non-linearization unit 43.

Although the embedding units 10 and 30 in FIG. 11 are omitted from FIG. 12, the embedding operation for input data may be understood with reference to the description above in FIG. 11.

Question information E may be configured as a plurality of questions E1, E2, . . . , and Ek expressed as a vector. Response information R may be configured as user's responses R1, R2, . . . , and Rk-1 to the respective questions E1, E2, . . . , and Ek expressed as a vector. Correct answer probability information r* may be configured as individual correct answer probabilities r1*, r2*, . . . , and rk* representing the user's correct answer probabilities for the respective questions expressed as vectors.

In an embodiment, the correct answer probability information rk* may be information on the probability in which the user gives a correct answer to the question Ek in the case where a user response to the question E1 is R1, a user response to the question E2 is R2, . . . , and a user response to the question Ek-1 is Rk-1.

The question information processor 21 may receive question information E and perform a series of operations related to self-attention. The operations may include dividing the question information E into queries, keys, and values, generating a plurality of head values for the respective values, generating a weight from a plurality of query head values and a plurality of key head values, performing masking on the generated weight, and applying the masked weight to the plurality of value head values, thereby generating prediction data.

The prediction data generated by the question information processor 21 may be attention information.

In particular, the question information processor 21 may perform upper triangular masking, as well as key-query masking, during the masking operation. Since the key-query masking and the upper triangular masking have been described in detail with reference to FIG. 4 above, a redundant description thereof will be omitted.

The non-linearization unit 22 may perform non-linearization of the prediction data output from the question information processor 21. ReLU function may be used in the non-linearization.

Although not shown in the drawing, one or more encoder neural networks 20 may be provided. Attention information generated in the encoder neural network 20 may be input back into the encoder neural network 20 so that a series of operations related to the self-attention and the non-linearization may be repeated several times.

Thereafter, the attention information may be divided into a key and a value to then be input into the second response information processor 42. The attention information may be used as the weight for query data, which is input into the second response information processor 42, and may be used to train the user knowledge tracking system 5.

The first response information processor 41 may receive response information R, and may perform a series of operations related to the self-attention, similarly to the question information processor 21. The operations may include dividing the question information E into queries, keys, and values, generating a plurality of head values for the respective values, generating a weight from a plurality of query head values and a plurality of key head values, performing masking on the generated weight, and applying the masked weight to the plurality of value head values, thereby generating prediction data.

The prediction data generated in the first response information processor 41 may be query data.

The second response information processor 42 may receive query data from the first response information processor 41, may receive attention information from the encoder neural network 20, and may output correct answer probability information r*.

The attention information may be input into the decoder neural network 40 to then be used as a weight for query data of the decoder, and may be used to train the user knowledge tracking system 5.

The attention information may be information on a weight provided in order to intensively consider a specific area of query data. Specifically, the user knowledge tracking system 5 may refer to again all input data E1, E2, . . . , Ek, R1, R2, . . . , and Rk-1 with respect to the encoder neural network 20 at every time step of predicting an output result rk* of the decoder neural network 40, and may pay attention to the data related to the corresponding output result.

The second response information processor 42 may generate rk*, which is correct answer probability information of the user to the question information Ek, according to the above operation.

Although not shown in the drawing, one or more decoder neural networks 40 may be provided. The correct answer probability information generated in the decoder neural networks 40 may be input back into the decoder neural networks 40 so that a series of operations related to the self-attention, the multi-head attention, and the non-linearization may be repeated several times.

Like the question information processor 21, the first response information processor 41 and the second response information processor 42 may perform upper triangular masking, as well as key-query masking, during the masking operation.

Figure 13:
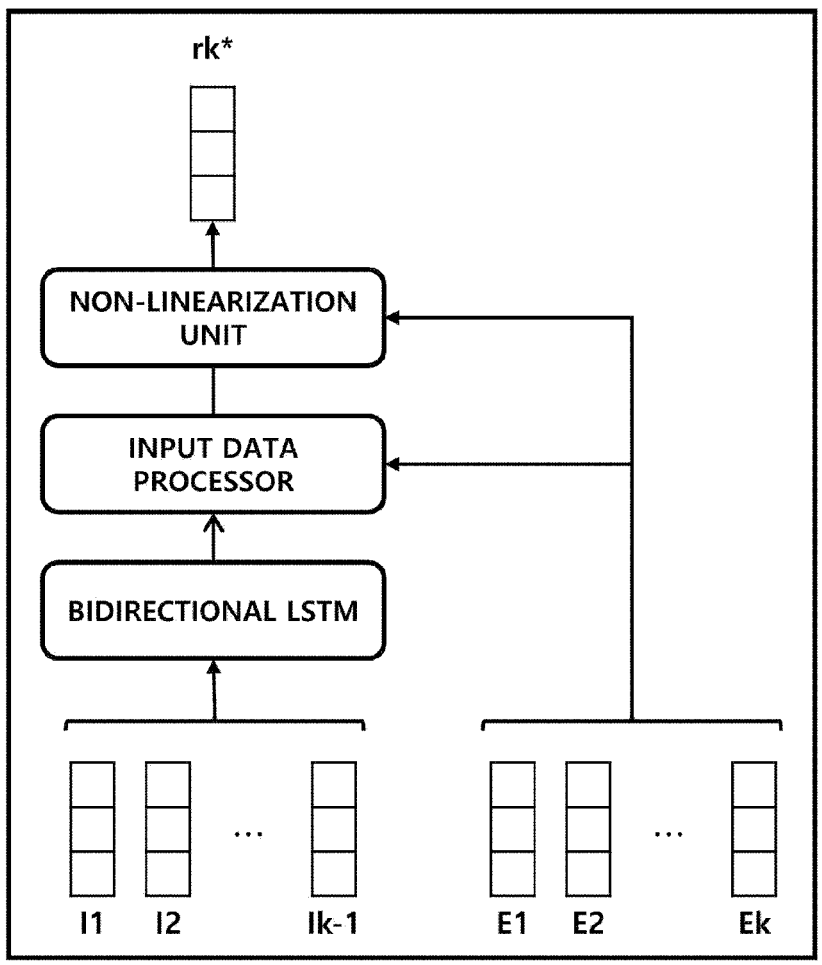
FIG. 13 is a diagram illustrating an example of an artificial neural network structure used in a conventional user knowledge tracking system.

FIG. 13 is a diagram illustrating an example of an artificial neural network structure used in a conventional user knowledge tracking system.

The conventional user knowledge tracking system shown in FIG. 13 includes an input data processor that performs an operation of paying attention to a specific portion of input data related to data to be predicted.

However, the conventional user knowledge tracking system shown in FIG. 13 is unable to correctly analyze numerous questions and user responses thereto because the layer of the input data processor is not sufficiently deep.

Figure 14:
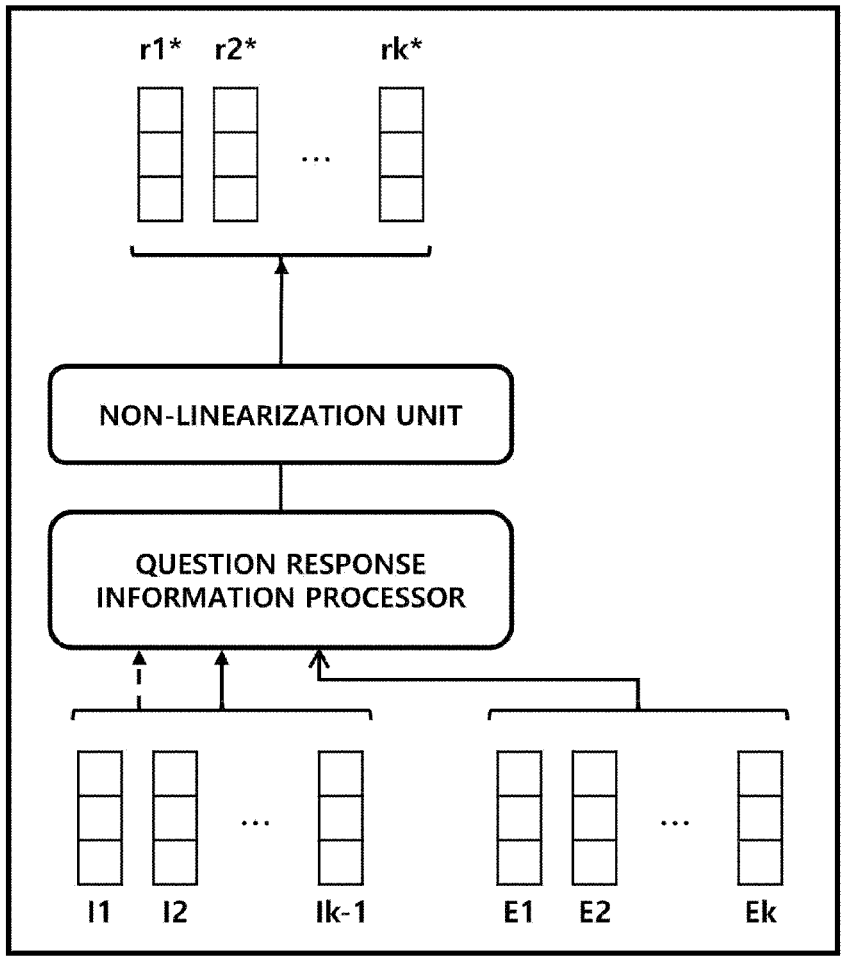
FIG. 14 is a diagram illustrating another example of an artificial neural network structure used in a conventional user knowledge tracking system.

FIG. 14 is a diagram illustrating another example of an artificial neural network structure used in a conventional user knowledge tracking system.

The conventional user knowledge tracking system shown in FIG. 14 may include a question response information processor and a non-linearization unit that perform operations similar to those of the encoder neural network 20 or the decoder neural network 40 in FIG. 12 described above.

However, the conventional user knowledge tracking system shown in FIG. 14 does not overcome a limitation of an existing system in which question response information I is provided to the question response information processor as a key and a value and the question information E is provided to the question response information processor as a query.

In order to solve the problem, the user knowledge tracking system 5 according to an embodiment of the present disclosure may predict the correct answer probability using only question information E and response information R, which have a smaller amount of data than the question response information I, and may implement an artificial neural network with improved accuracy by implementing the layer where attention is performed to be sufficiently deep.

FIG. 15 is a diagram illustrating the configuration of input data of the user knowledge tracking system shown in FIG. 11.

Referring to FIG. 15, input data may include question information E, question response information I, and response information R. Specific data may be selected and used from among three types of input data depending on the artificial neural network model to be implemented.

Question identification information may be a unique value assigned to each question. The user or computer may recognize what the question is through the question identification information.

Question category information may be information indicating the type of the question. For example, in the TOEIC test question, the question category may be information indicating whether it is a listening part or a reading part.

Input sequence position information may be information indicating the position of a corresponding question or a response to the corresponding question in the overall question sequence or overall response sequence. Unlike the RNN structure, since the sequence of input data is not indicated in the transformer structure, it is necessary to separately indicate the position of each piece of data within the overall data sequence in order to distinguish the sequence thereof. The input sequence position information may be embedded together with input data, and may be added to the embedded input data, thereby being input into the encoder neural network 20 and the decoder neural network 40.

Response accuracy information may be information indicating whether the response of the user is correct or wrong. For example, if the response of the user is correct, the response accuracy information may have index "1", which may be mapped to a vector. On the other hand, if the response of the user is wrong, the response accuracy information may have index "0", which may be mapped to a vector.

Elapsed time information may be information obtained by converting the time taken in order for the user to solve the question into a vector. The elapsed time information may be expressed in seconds, minutes, hours, or the like, and if a predetermined time (e.g., 300 seconds) elapses, it may be determined that a corresponding time (300 seconds) has elapsed.

Time record information may be information representing the time at which the user solves a question as a vector. The time record information may be expressed as time, day, month, year, or the like.

As shown in FIG. 15, the question information E may include question identification information, question category information, and input sequence position information. That is, it may include information about what the question is, the type of question, and the position of the question in the entire question data.

The response information R may include input sequence position information and response accuracy information. That is, it may include information about the position of the user's response in the entire response data and whether the user's response is correct or wrong.

The question response information I may include question identification information, question category information, input sequence position information, response accuracy information, elapsed time information, and time record information. The question response information I may further include elapsed time information and time record information in addition to all information of the question information E and response information R.

Since the user knowledge tracking system 5 according to an embodiment of the present disclosure may predict whether or not the user's answer is correct using only the question information E and the response information R, instead of the question response information I, the amount of used data may be reduced, thereby increasing computational performance and memory efficiency. In addition, the user knowledge tracking system 5 according to an embodiment of the present disclosure may input the question information E configured as the above-described data format into the encoder neural network 20 of the user knowledge tracking system 5, and may input the response information R configured as the above-described data format into the decoder neural network 40 of the user knowledge tracking system 5 to generate correct answer probability information r*, thereby providing the effect of predicting the correct answer probability with improved accuracy.

In the conventional transformer structure, the key-query masking is performed in the encoder neural network, and the upper triangular masking is performed together with the key-query masking in the decoder neural network. In the embodiment of the present disclosure, the upper triangular masking may be performed both in the encoder neural network 20 and in the decoder neural network 40, so that the correct answer probability information is able to be controlled to rely only on the question information E1, E2, . . . , and Ek previously provided to the user and the response information R1, R2, . . . , and Rk-1 that the user has already submitted.

Figure 16:
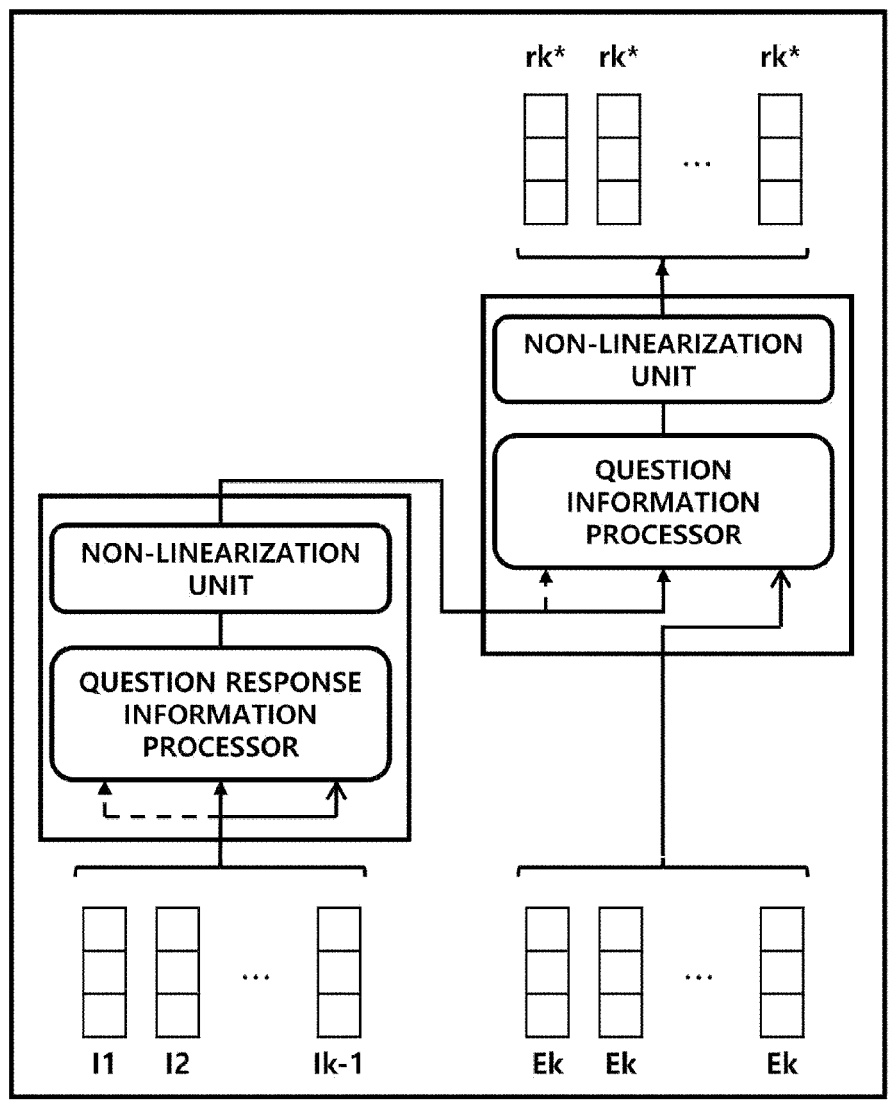
FIG. 16 is a diagram illustrating the structure of an artificial neural network for outputting a response prediction result using lower triangular masking and question response information.

FIG. 16 is a diagram illustrating an artificial neural network structure (LTMTI) for outputting a response prediction result using lower triangular masking and question response information I.

Referring to FIG. 16, question response information I may be input as input data to the encoder neural network, and question information E may be input as input data to the decoder neural network. In addition, the decoder neural network may perform only multi-head attention in which the self-attention process is omitted.

Furthermore, in the question response information processor and the question information processor in FIG. 16, the attention in which the lower triangle of the prediction data, instead of the upper triangle thereof, is masked may be performed.

Figure 17:
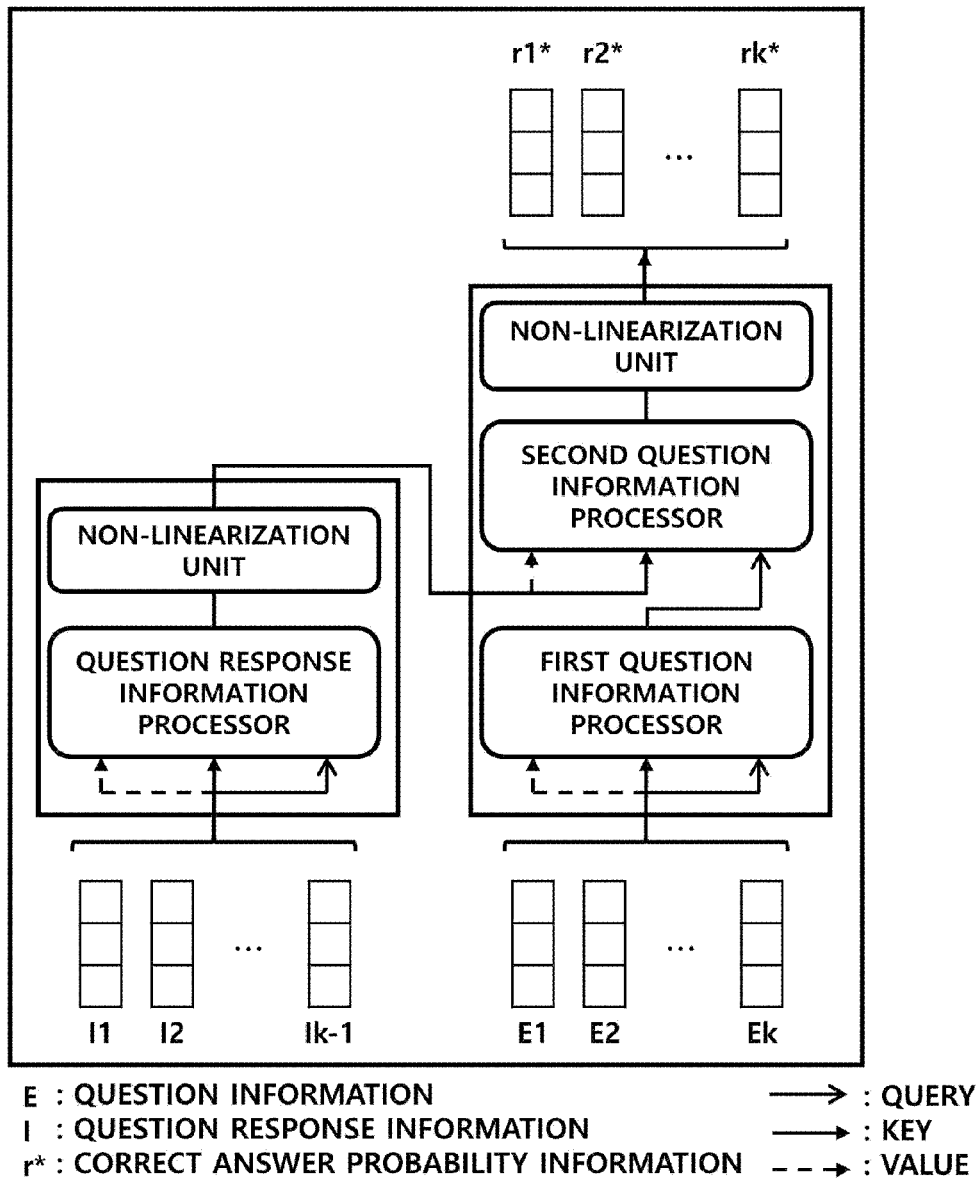
FIG. 17 is a diagram illustrating the structure of an artificial neural network for outputting a response prediction result using upper triangular masking and question response information.

FIG. 17 is a diagram illustrating an artificial neural network structure (UTMTI) for outputting a response prediction result using upper triangular masking and question response information I.

Referring to FIG. 17, question response information I may be input as input data to the encoder neural network, and question information E may be input as input data to the decoder neural network.

Figure 18:
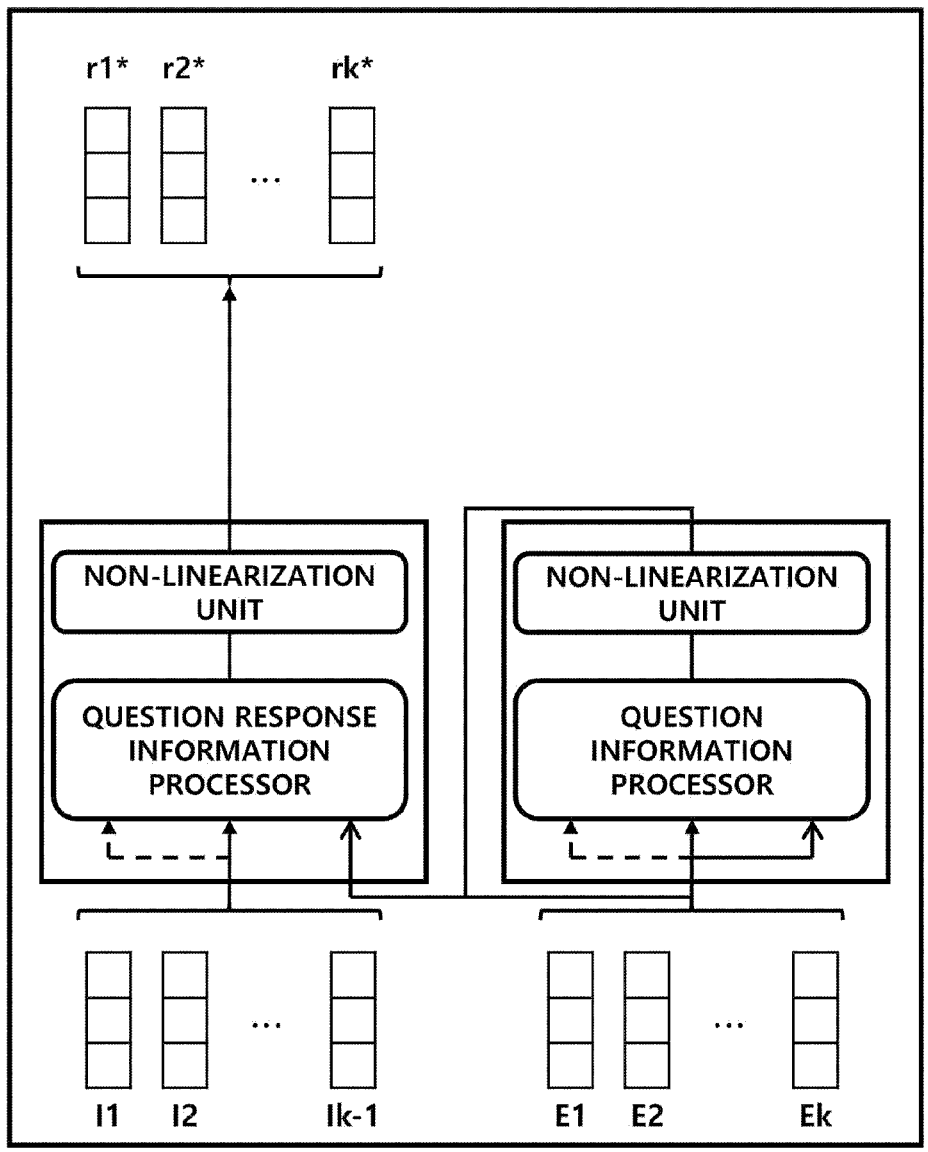
FIG. 18 is a diagram illustrating an artificial neural network structure for outputting a response prediction result using upper triangular masking, question response information, and a stacked SAKT.

FIG. 18 is a diagram illustrating an artificial neural network structure (SSAKT) for outputting a response prediction result using upper triangular masking, question response information I, and a stacked SAKT.

Referring to FIG. 18, question response information I may be input as input data to the encoder neural network, and question information E may be input as input data to the decoder neural network. In addition, the question response information processor may perform multi-head attention, instead of self-attention, and the question information processor may perform self-attention.

Figure 19:
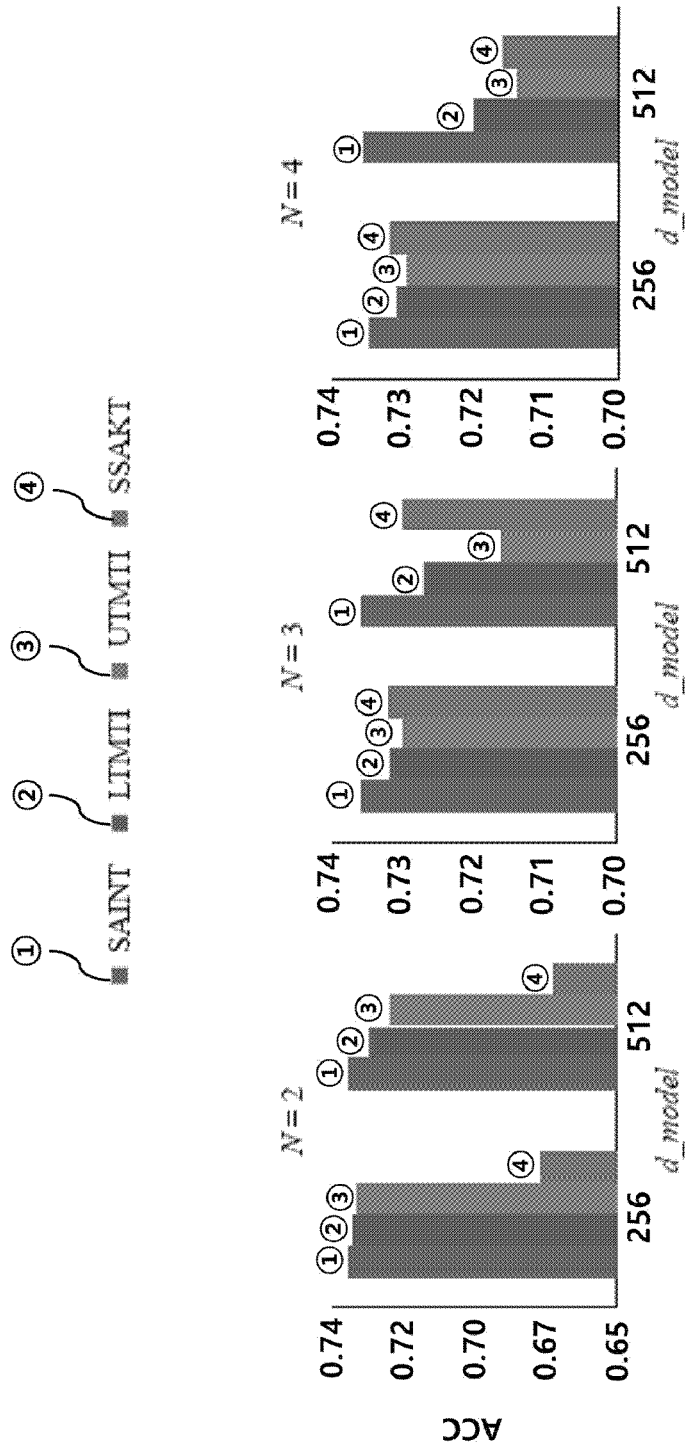
FIG. 19 is a graph showing the comparison of the ACC performance between the artificial neural network structures in FIGS. 12 and 16 to 18.

FIG. 19 is a graph showing the comparison of the ACC performance between the artificial neural network structures in FIGS. 12 and 16 to 18.

ACC may be an indicator for sensitivity. ACC may indicate the ratio of the correct response information to the total response information with incorrect answers. N may indicate the number of stacked encoders and decoders. d_model may indicate an output order of all lower layers of the model. The user knowledge tracking system 5 in FIG. 12 is denoted by SAINT. As a result of the statistics, it can be seen that ACC of SAINT is about 1.8% higher than that of other models on average.

Figure 20:
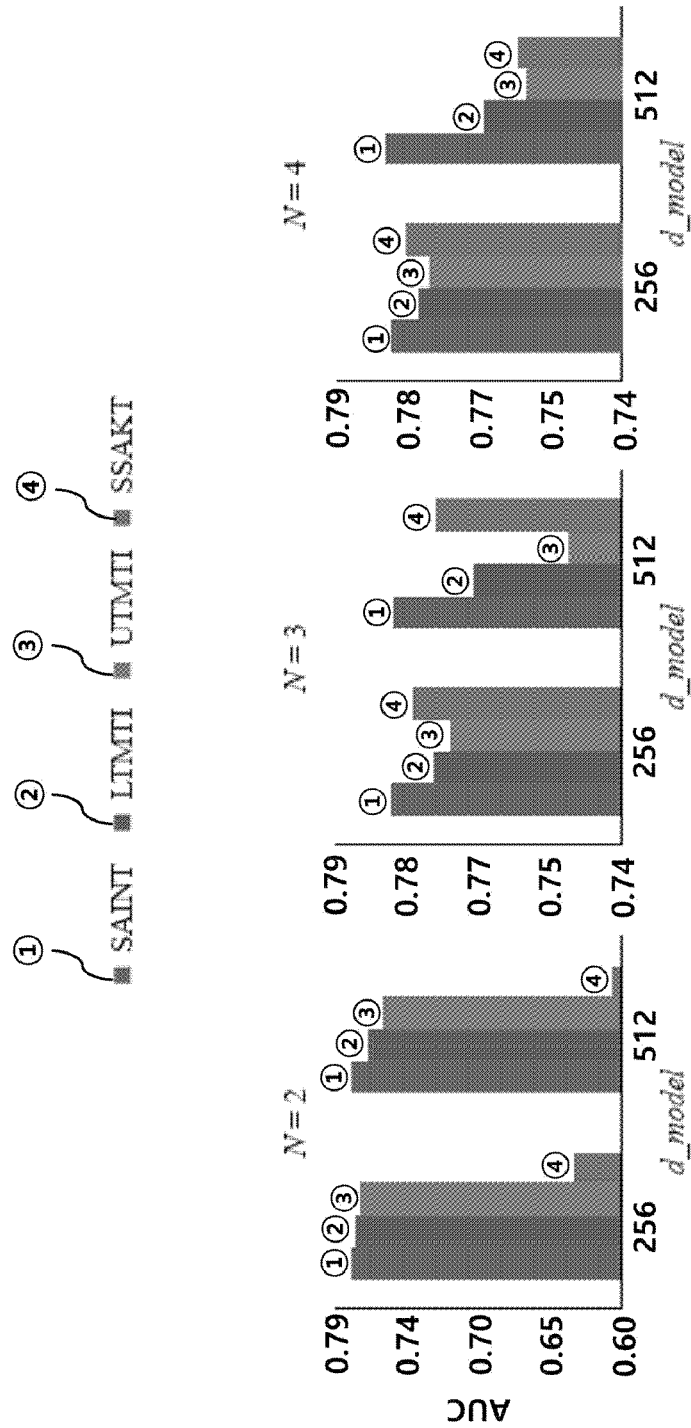
FIG. 20 is a graph showing the comparison of the AUC performance between the artificial neural network structures in FIGS. 12 and 16 to 18.

FIG. 20 is a graph showing the comparison of the AUC performance between the artificial neural network structures in FIGS. 12 and 16 to 18.

AUC may represent the ratio of correct predictions to overall predictions. N may indicate the number of stacked encoders and decoders. d_model may indicate an output order of all lower layers of the model. The user knowledge tracking system 5 in FIG. 12 is denoted by SAINT. As a result of the statistics, it can be seen that AUC of SAINT is about 1.07% higher than that of other models on average.

Figure 21:
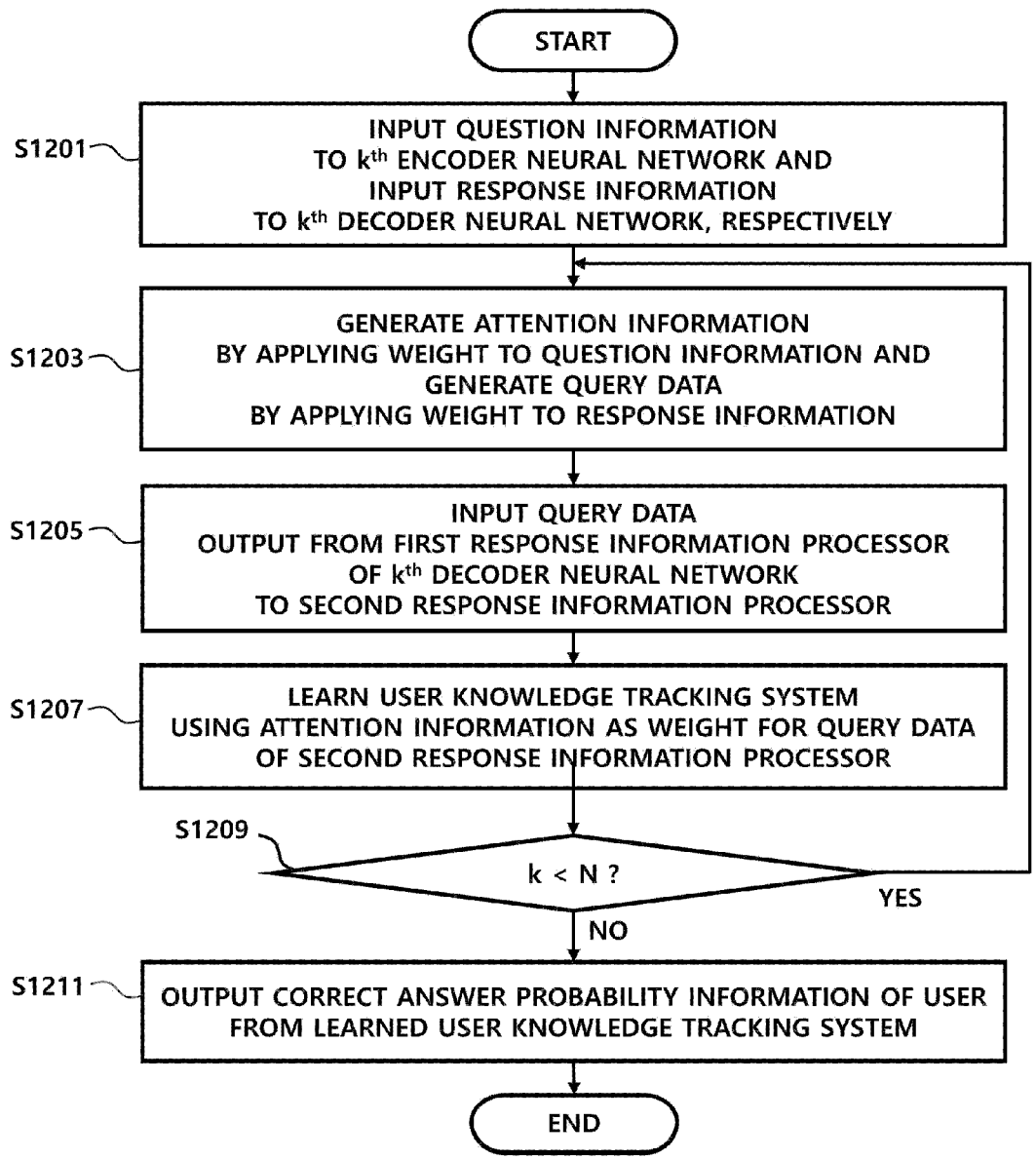
FIG. 21 is a flowchart illustrating the operation of the user knowledge tracking system shown in FIG. 11.

FIG. 21 is a flowchart illustrating the operation of the user knowledge tracking system 5 shown in FIG. 11.

Referring to FIG. 21, in step S1201, the user knowledge tracking system 5 may input question information E to a $k^{th}$ encoder neural network 20 and input response information R to a $k^{th}$ decoder neural network 40, respectively.

The question information E may include question identification information, question category information, and input sequence position information (see FIG. 15). That is, it may include information about what the question is, the type of question, and the position of the question in the entire question data.

The response information R may include input sequence position information and response accuracy information (see FIG. 15). That is, it may include information about the position of the user's response in the entire response data and whether the user's response is correct or wrong.

In step S1203, the user knowledge tracking system 5 may generate attention information by applying a weight to the question information E and generate query data by applying a weight to the response information R.

Specifically, the question information E may apply a weight to the question information E through self-attention. Self-attention may be an operation of applying a weight to the portion to be considered important in specific data and reflecting the same back to oneself.

The response information R may be weighted by performing multi-head attention based on attention information, as well as self-attention.

In step S1205, query data output from the first response information processor 41 of the $k^{th}$ decoder neural network 40 may be input to the second response information processor 42. The query data may be prediction data output from the first response information processor 41.

In step S1207, the user knowledge tracking system 5 may use the attention information as a weight for the query data of the second response information processor 42, thereby training the user knowledge tracking system 5.

In step S1209, the user knowledge tracking system 5 may compare k with N, and if k is equal to N, may perform step S1211, and if k is smaller than N, may return to step S1203 to repeat step S1203 to step S1207.

Since the encoder neural network 20 and the decoder neural network 40 may be stacked as many as N, the above process may be repeated until a series of operations including the self-attention and the multi-head attention for all the stacked encoder neural networks 20 and decoder neural networks 40 are completed.

In step S1211, the user knowledge tracking system 5 may output correct answer probability information of the user from the learned user knowledge tracking system 5.

This is an inference process for processing input data depending on the weight determined in the learning process to output correct answer probability information indicating the probability of a correct answer to the question the user is solving.

Figure 22:
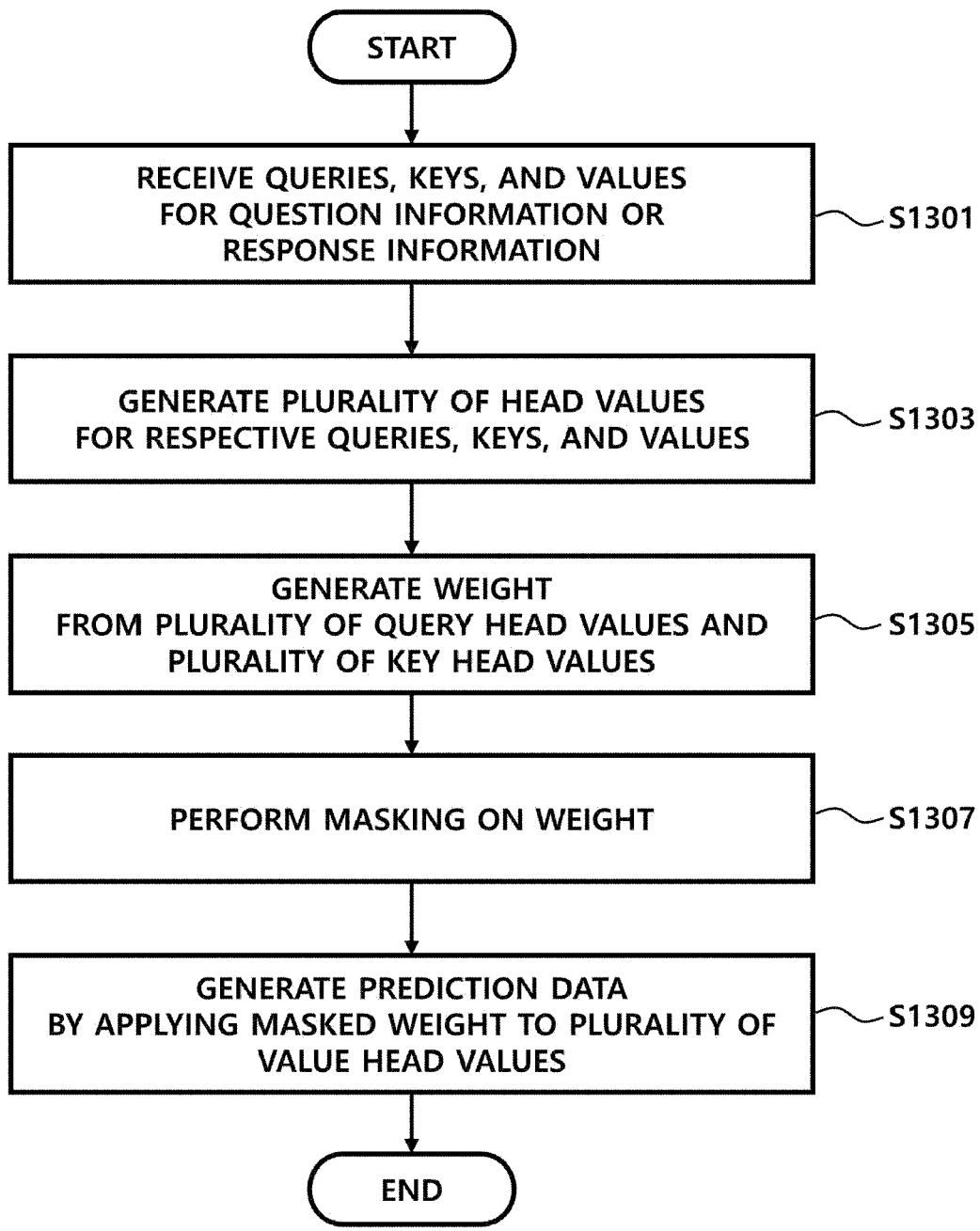
FIG. 22 is a flowchart illustrating the detailed operation of the question information processor, the response information processor, or the question response information processor shown in FIGS. 12 and 16 to 18.

FIG. 22 is a flowchart illustrating the detailed operation of the question information processor 21, the response information processors 41 and 42, or the question response information processor shown in FIGS. 12 and 16 to 18.

Referring to FIG. 22, in step S1301, each element may receive a query, a key, and a value of question information E or response information R. The respective values may be expressed as vectors, and may be divided according to a role to be used.

In step S1303, each element may generate a plurality of head values for each of the query, the key, and the value.

Each element may generate a weight from a plurality of query head values and a plurality of key head values in step S1305, and a masking operation including a key-query masking and upper triangular masking may be performed in step S1307.

Key-query masking may be an optional operation of imposing a penalty to a null value (zero padding) to prevent attention from being performed. The value of the prediction data on which the key-query masking is performed may be expressed as 0, and the remaining part thereof may be expressed as 1.

Upper triangular masking may be an operation to prevent attention from being performed on information corresponding to a future position for prediction of correct answer probability for the next question. For example, it may be an operation of masking performing of attention on a question that has not yet been solved in order to prevent correct answer probability information from being predicted from a question that the user has not yet solved. Like the key-query masking, the value of the prediction data on which the upper triangular masking is performed may be expressed as 0, and the remaining part thereof may be expressed as 1.

Thereafter, in operation S1309, prediction data may be generated by applying the masked weight to the plurality of value head values.

The prediction data generated by the question processor 21 may be attention information, the prediction data generated by the first response information processor 41 may be query data, and the prediction data generated by the second response information processor 42 may be correct answer probability information r*.

The user knowledge tracking system 5 according to the present disclosure may use an optimized input data format and use upper triangular masking both in the encoder neural network 20 and in the decoder neural network 40 of the transformer structure, thereby providing improved performance.

The embodiments of the present disclosure shown in the present specification and drawings are merely provided for specific examples to easily explain the technical concept of the present disclosure and help understanding of the present disclosure, and are not intended to limit the scope of the present disclosure. It will be obvious to those of ordinary skill in the art to which the present disclosure pertains that other modifications based on the technical spirit of the present disclosure are able to be implemented in addition to the embodiments disclosed herein.

INDUSTRIAL APPLICABILITY

As described above, a system including a plurality of encoder neural networks and a plurality of decoder neural networks and an operation method of the system may be applied to an online education service field.

The invention claimed is:

1. An operation method of a user drop-out rate prediction system comprising a plurality of encoder neural networks and a plurality of decoder neural networks, the operation method comprising:
    learning an artificial intelligence model so as to predict drop-out rate information, which is a probability that a user drops out while learning a learning program that is a learning content provided online, on the basis of question information comprising session position information and response information of the user; and
    predicting the user's drop-out rate information for an input question on the basis of the learned artificial intelligence model;
    wherein the learning the artificial intelligence model comprises:
    inputting question information to a kth encoder neural network and inputting response information to a kth decoder neural network;
    generating a weight for the response information and generating query data, which is information about a target question of which the user's dropping-out is desired to be identified, by reflecting the generated weight to the response information, and generating attention information to be used as a weight for the query data by reflecting a weight to the question information; and
    learning the user drop-out rate prediction system using the attention information as a weight for the query data,
    wherein the session position information indicates a position of the question in a session, which is a learning unit distinguished according to time based on a time step at which the user's dropping-out occurs, and
    wherein the generating the attention information comprises predicting a drop-out rate from a question previously provided to the user and response information submitted by the user by performing upper triangular masking on the plurality of encoder neural networks and the plurality of decoder neural networks.

2. The operation method of claim 1, wherein whether or not the user drops out is determined according to whether or not a state in which no input is received from the user while the learning content is running lasts for a predetermined time.

3. The operation method of claim 2, wherein the predetermined time is configured differently for each question depending on the question type or question category.

4. The operation method of claim 1, wherein whether or not the user drops out comprises the case where the user directly terminates the learning program, the case where a screen of a mobile device is turned off, the case where the learning program switches to a background state as another application is executed, or the case where the mobile device is turned off.

5. The operation method of claim 1, further comprising repeating, if the stacked number of the plurality of encoder neural networks and the plurality of decoder neural networks is N, and if k is smaller than the stacked number N, generating the attention information and learning the user drop-out rate prediction system.

6. The operation method of claim 5, further comprising, if k is equal to the stacked number N, terminating the learning of the user drop-out rate prediction system and outputting correct answer probability information, which is the probability that the user answers the question, from the learned user drop-out rate prediction system.

7. The operation method of claim 1, wherein the generating the attention information comprises performing key-query masking that is an operation of preventing execution of attention by imposing the penalty to a null value (zero padding) as an optional choice.

8. A user drop-out rate prediction system for learning an artificial intelligence model so as to predict drop-out rate information, which is a the probability that a user drops out while learning, on the basis of question information comprising session position information and response information of the user and predicting user drop-out rate information for an input question on the basis of the learned artificial intelligence model, the system comprising:
    a $k^{th}$ encoder neural network configured to receive the question information and generate attention information by reflecting a weight to the question information; and
    a $k^{th}$ decoder neural network configured to receive the response information, generate a weight for the response information, generate query data by reflecting the generated weight to the response information, and learn the user drop-out rate prediction system using the attention information as a weight for the query data,
    wherein the question information comprises session position information indicating a position of a corresponding question in a session, which is a learning unit distinguished according to time based on a time step at which the user's dropping-out occurs, and
    wherein the plurality of encoder neural networks and the plurality of decoder neural network predict a drop-out rate from a question previously provided to the user and response information submitted by the user by performing upper triangular masking.

9. An operation method of a user knowledge tracking system comprising a plurality of encoder neural networks and a plurality of decoder neural networks, the operation method comprising:
    inputting question information into a $k^{th}$ encoder neural network and inputting response information into a $k^{th}$ decoder neural network;
    generating a weight for the response information and generating query data, which is information about a question that is a target for predicting the probability of a user's correct answer, by reflecting the generated weight to the response information and generating attention information to be used as a weight for the query data by reflecting a weight to the question information; and
    learning the user knowledge tracking system using the attention information as a weight for the query data.

10. The operation method of claim 9, further comprising repeating, if the stacked number of the plurality of encoder neural networks and the plurality of decoder neural networks is N, and if k is smaller than N, generating the attention information and learning the user knowledge tracking system.

11. The operation method of claim 9, wherein the generating the attention information comprises:

performing key-query masking that is an operation to prevent attention from being performed on a null value (zero padding) as an optional choice; and performing upper triangular masking that is an operation to prevent attention from being performed on information corresponding to a future position for prediction of the next question.

12. The operation method of claim 9, wherein the question information is configured as a plurality of questions expressed as vectors, and wherein the response information is configured as user's responses to the respective questions expressed as vectors.

13. The operation method of claim 10, further comprising, if k is equal to or greater than N, terminating the learning of the user knowledge tracking system and outputting correct answer probability information, which is the probability that the user answers the question, from the learned user knowledge tracking system.

14. A user knowledge tracking system comprising a plurality of encoder neural networks and a plurality of decoder neural networks, the user knowledge tracking system comprising:

a $k^{th}$ encoder neural network configured to receive question information and generate attention information to be used as a weight for query data by reflecting a weight to the question information; and a $k^{th}$ decoder neural network configured to receive response information, generate a weight for the response information, and generate the query data, which is information about a question to which a correct answer probability is desired to be predicted by a user, by reflecting the generated weight to the response information, and use the attention information as a weight for the query data, thereby learning the user knowledge tracking system.

* * * * *